United States Patent [19]

Krekeler

[11] 4,057,294
[45] Nov. 8, 1977

[54] WEDGE ARRANGEMENT FOR REMOVABLY AFFIXING A WORK TOOL OR WORK TOOL HOLDER TO A BASE MEMBER ON MINING, ROAD WORKING OR EARTH MOVING MACHINERY, AND THE LIKE

[75] Inventor: Claude B. Krekeler, Cincinnati, Ohio

[73] Assignee: The Cincinnati Mine Machinery Company, Cincinnati, Ohio

[21] Appl. No.: 601,035

[22] Filed: Aug. 1, 1975

[51] Int. Cl.$^2$ .......................................... E21C 13/00
[52] U.S. Cl. ................................... 299/93; 82/36 R; 175/374; 403/381; 407/101; 407/108
[58] Field of Search ............ 82/24, 36; 299/86, 91–93; 175/410, 412, 413; 29/96; 403/381, 370, 374, 409; 30/329

[56] References Cited

U.S. PATENT DOCUMENTS

| 820,530 | 5/1906 | Sturm | 175/412 |
|---|---|---|---|
| 2,281,706 | 5/1942 | Montgomery et al. | 82/36 |
| 2,547,789 | 4/1951 | Skeel | 403/370 |
| 3,032,152 | 5/1962 | Titsler | 403/374 |
| 3,107,562 | 10/1963 | Miller | 82/36 |
| 3,397,013 | 8/1968 | Krekeler | 299/86 |
| 3,489,042 | 1/1971 | Papp | 82/36 |
| 3,563,325 | 2/1971 | Miller | 175/410 |
| 3,575,072 | 4/1971 | Silver et al. | 82/36 X |
| 3,579,936 | 5/1971 | Andersson et al. | 403/370 |
| 3,633,949 | 1/1972 | Pfluger | 403/343 |
| 3,834,764 | 9/1974 | Krekeler | 299/92 |

FOREIGN PATENT DOCUMENTS

| 22,042 | 8/1903 | United Kingdom | 299/93 |
|---|---|---|---|
| 934,237 | 8/1963 | United Kingdom | 299/91 |

Primary Examiner—Ernest R. Purser
Assistant Examiner—Richard E. Favreau
Attorney, Agent, or Firm—Melville, Strasser, Foster & Hoffman

[57] ABSTRACT

A wedge arrangement for removably affixing a work tool or work tool holder to a base member on mining, road working or earth moving machinery, and the like, and being particularly useful in the mining, road planing and earth digging areas. The arrangement is such that the removable member may be readily replaced and wear and tear on the base member greatly reduced to the extent that such base member will not be destroyed or otherwise rendered useless; such base member may be a part which is permanently secured to the basic machine or it may in fact be the machine itself or some integral part thereof. The base member is preferably provided with a slot of a size sufficient to receive both the removable member and a wedge element; such member and element may be placed within the slot from above thereof, lateral entry of the removable member and wedge element into the slot often being unnecessary. Means are provided to move the wedge element so as to effect a frictional engagement between the removable member and the base member to effect an interference fit in which there is no relative motion between these members and thus virtually no wear. (It is possible to reverse this arrangement and provide the removable member with the slot and the base member with a suitable male element which, along with the wedge element, will be received in the slot.) The removable member may be provided with a bit, road planing device or digging tooth, which working elements may in turn be removably affixed to and/or within the removable part.

71 Claims, 34 Drawing Figures

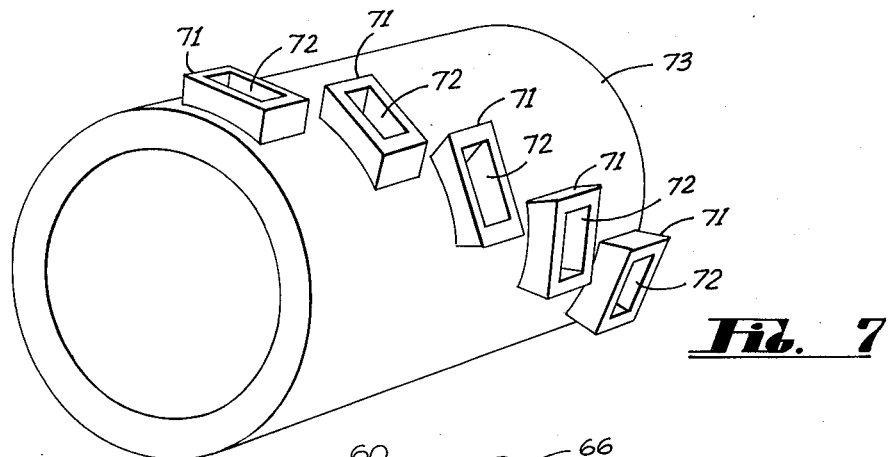
Fig. 7
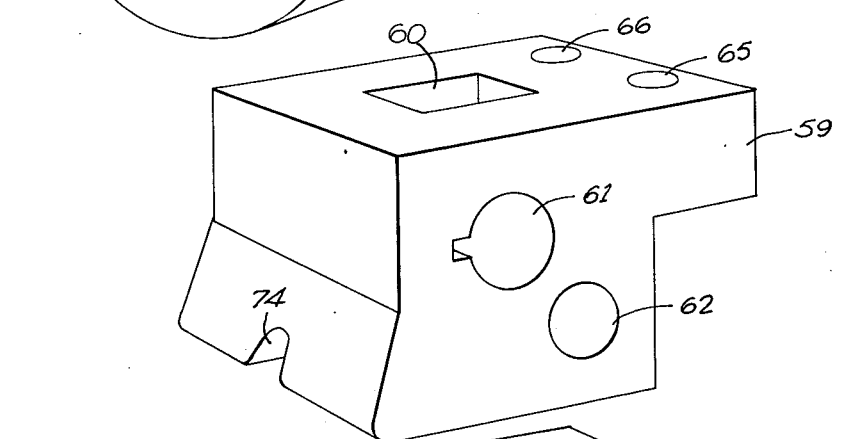
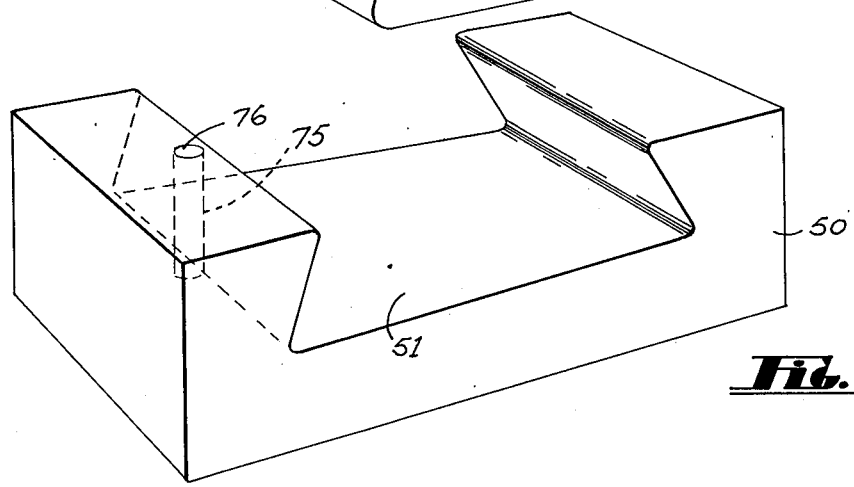
Fig. 8
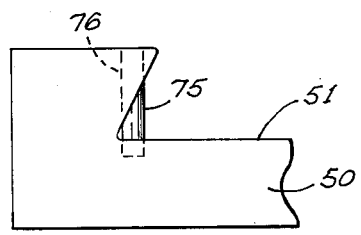
Fig. 9

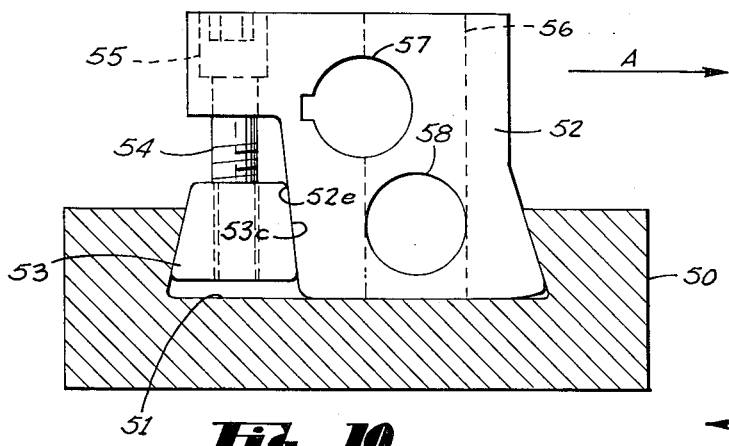
Fib. 10
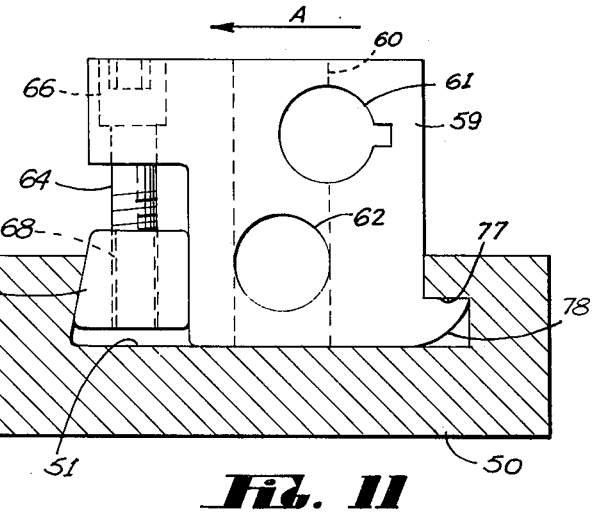
Fib. 11
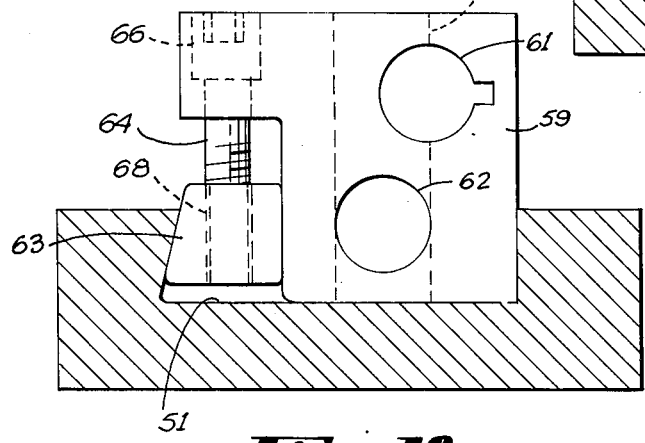
Fib. 12
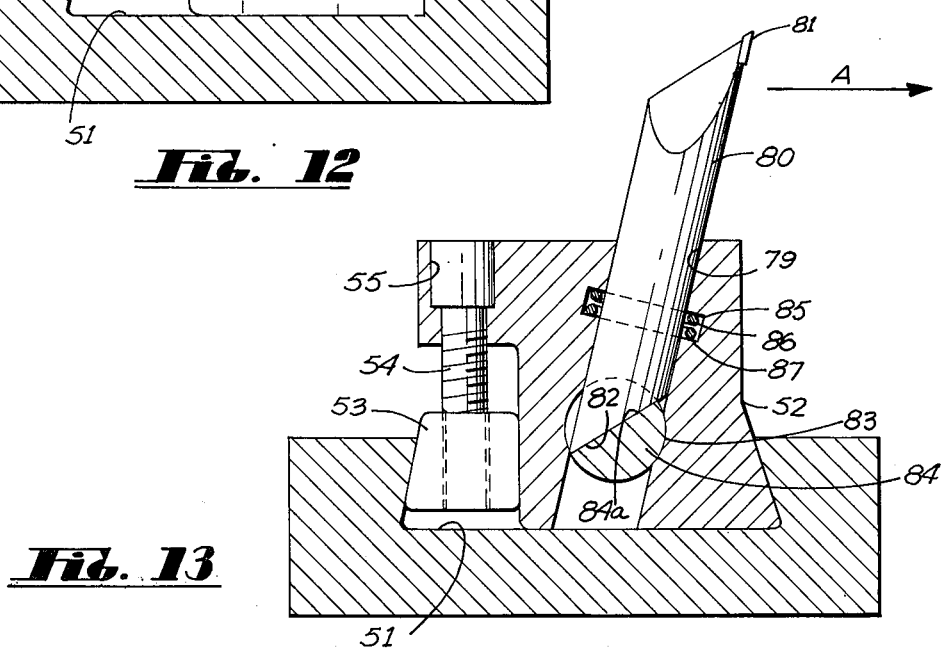
Fib. 13

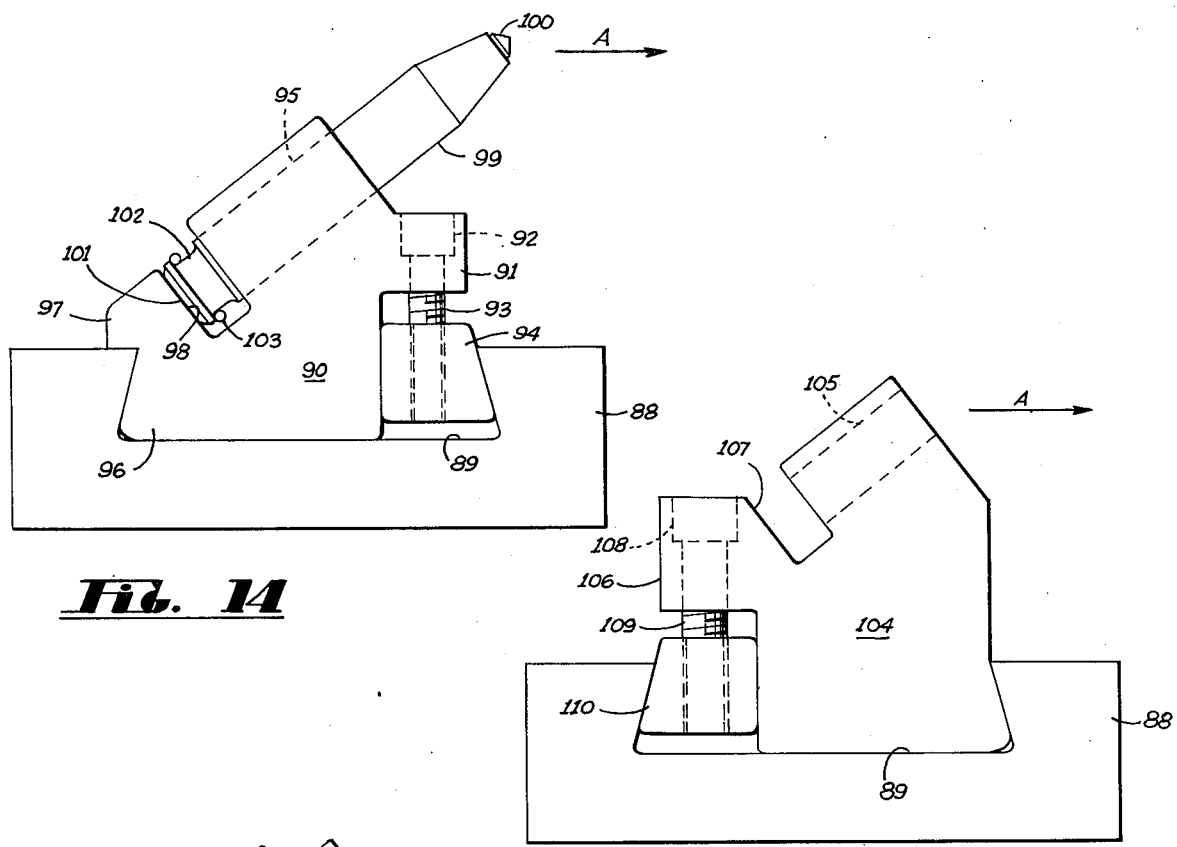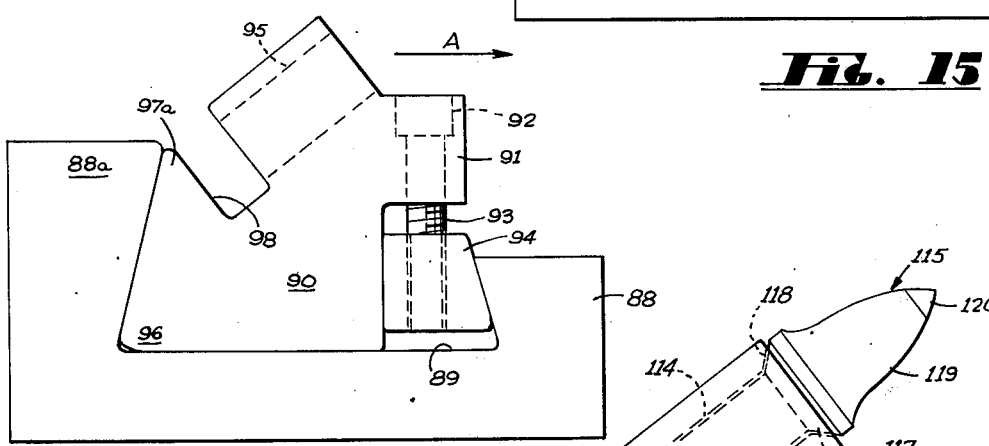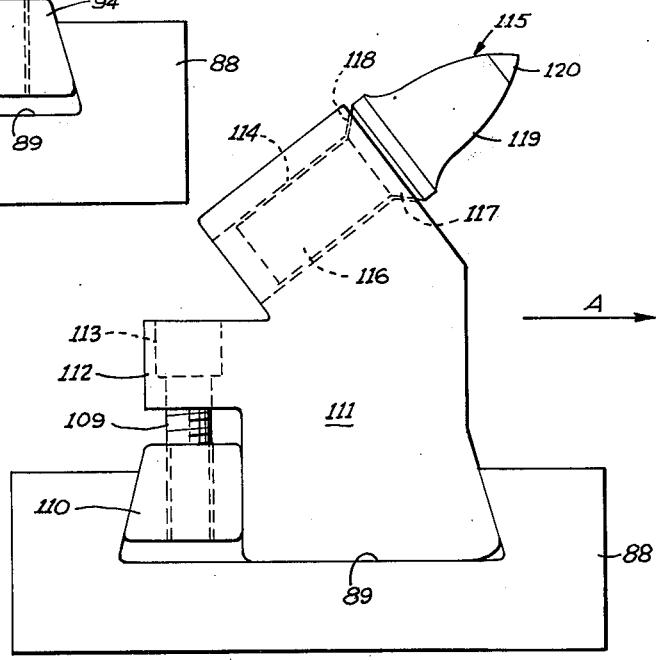

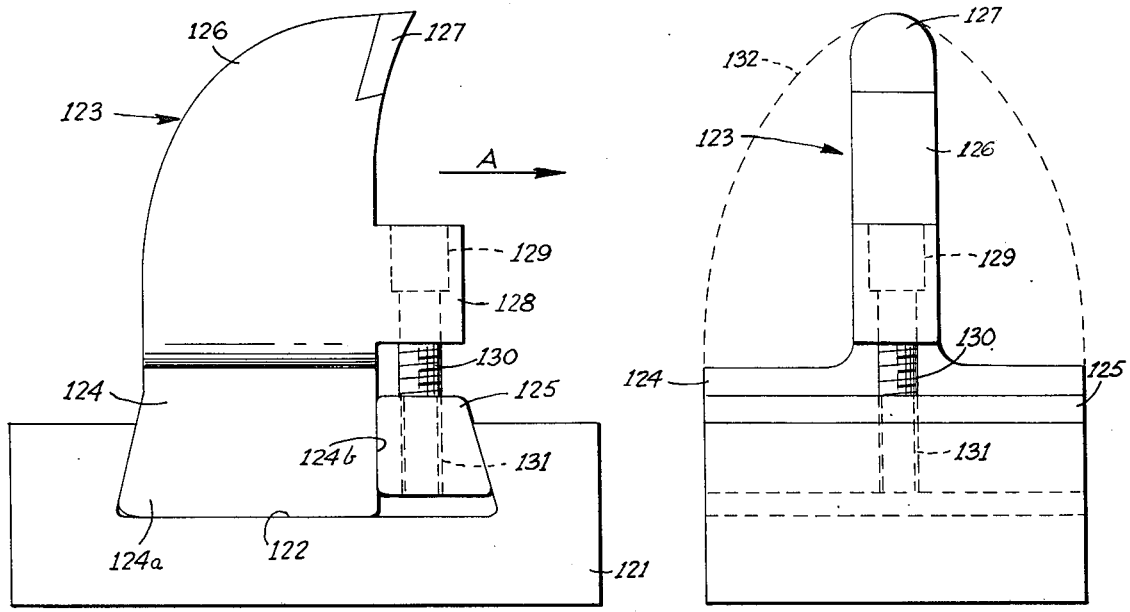
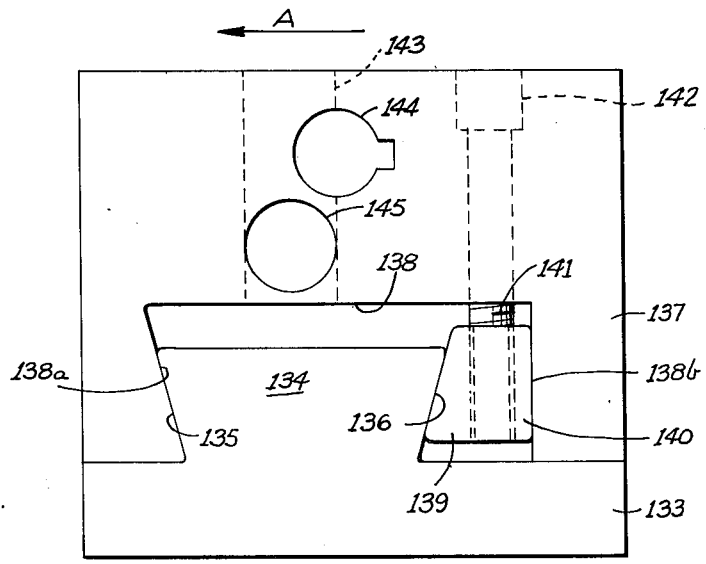
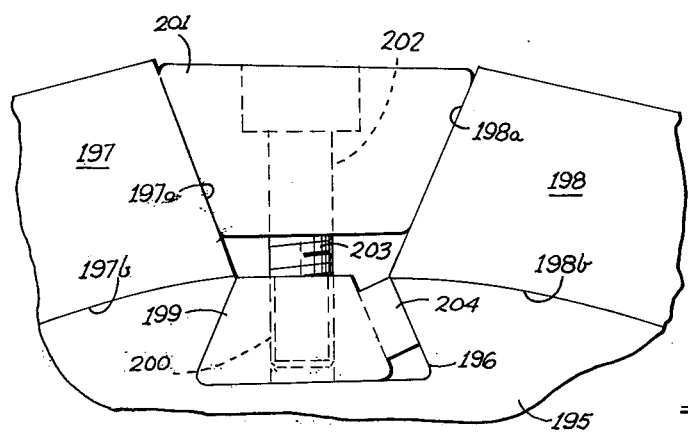

WEDGE ARRANGEMENT FOR REMOVABLY AFFIXING A WORK TOOL OR WORK TOOL HOLDER TO A BASE MEMBER ON MINING, ROAD WORKING OR EARTH MOVING MACHINERY, AND THE LIKE

BACKGROUND OF THE INVENTION

1. Field of the Invention

This invention has particular use in the mining, road planing and earth digging fields. More specifically the invention relates to means for affixing removable members such as cutter bit lugs to a base member such as the driven element of a mining machine or the like. It has particular application to cutter bit lugs and base members whereby the lugs may be easily and quickly installed or removed and replaced, all without damage to the driven element or base member. In like manner the invention may be utilized for removably securing the working element of a road working machine to the driven element thereof or for removably securing the digging tooth to the driven element of an earth digging or dipping machine.

2. Description of the Prior Art

No search of the United States Patent art has been made in connection with this invention. There is some known United States Patent Art, however, which is relevant. In the past, for example, it has been found desirable to provide means for quickly and easily removing and replacing worn bits from the lugs provided to carry them. U.S. Pat. No. 2,965,365 discloses quite satisfactory arrangements for accomplishing this. Means for retaining a rotatable bit within a lug of a mining machine in such manner that the bit may be readily replaced are shown in U.S. Pat. No. 3,397,012. Other such means are disclosed in U.S. Pat. No. 3,114,537. In U.S. Pat. No. 3,622,206 similar means are shown for enabling quick and easy removal of a non-rotatable bit from a bit carrying lug.

In addition to various arrangements for permitting the ready removal of worn bits, some of which are alluded to above, the prior art recognized the importance of also providing arrangements by means of which the bit carrying lug itself could be easily and readily removed from the base member on which it was mounted. U.S. Pat. No. 3,338,634, for example, discloses a pin arrangement by means of which a bit carrying lug or block may be removed from the base member or driven element of a mining machine and the like. This particular arrangement, however, placed a great deal of strain on the pin used to connect the block to the base member. U.S. Pat. No Re. 28,310 described a pin-on-block arrangement for removably securing a block to the driven element of a mining machine or the like in which pins were used to effect the connection, the arrangement being such, however, that most of the stress resulting from the cutting forces arising during the mining or digging functions were taken off the pin. This latter arrangement, while quite satisfactory in many respects, required a certain amount of room for manipulation of the pins in securing the removable blocks to the base members; it was not possible to place such blocks in flush side-by-side relationship on a driven member.

There are other patents which disclose various ways of not only removably affixing bits, teeth and the like to suitable lugs or blocks provided therefor, but also for removably affixing the lugs or blocks to the driven element of a mining or digging machine and the like. Some of these, for example, were applicable to "plumb-bob" bits. These prior known arrangements, while generally satisfactory in many respects, did require a relatively large amount of space to accommodate the various means for affixing the removable lug or block to the driven element of the working machine whatever it was.

SUMMARY OF THE INVENTION

A portion of the driven element of a machine, whether such portion be a base member permanently affixed to the driven element or whether it be the driven element itself or some integral part thereof, is provided with a female, generally dove-tailed slot of sufficient size to accommodate both the removable member and a wedge element, both of which in most embodiments may be moved into the slot from above. Means are provided for effecting movement of the wedge element after it and the block have been placed within the slot so as to wedge the block within the slot thereby to frictionally engage the block with the slotted driven element. In this manner an interference fit is effected which involves no relative movement between the removable member and the base member in use and thus there is virtually no wear between these parts. The portion of the driven element defining the female dove-tailed slot is virtually indestructible.

In the preferred arrangement one or more bolts are employed within the removable member and wedge element to effect movement of the wedge element so as to wedge the removable member into secure frictional engagement with the driven element of the machine. Frictional engagement of the removable member and base member — the interference fit —0 is accomplished along the path of movement imparted to them by the machine and lateral movement of the removable member within the dove-tailed slot is not apt to occur. It is possible, however, if desired, to provide an additional engagement between the base member and the removable member so as positively to prevent such lateral movement. Although it is preferred that the slot be dove-tailed at both its opposed ends as considered along the line of movement of the base member in which the slot is provided, it is possible to provide such dove-tail or undercut at only one end of the slot.

The bolts which are employed in the preferred forms of the invention effect good frictional engagement of the removable member (the bit carrying block or lug and the like) with the base member both fore and aft along the line of travel of the driven element of which the base member is a part, in one instance the frictional engagement being among an overhanging part of the base member, the wedge element and the removable member, and in the other instance such frictional engagement being directly between the removable member and, usually, another overhanging part of the base member. The bolts are accessible and may often be removed in the usual manner. The arrangement is such, however, that if they become jammed they may be readily burned with a torch and the like, or they may be broken by use of a drift pin or wedge, whereafter it is a simple matter to remove the removable member from the base member, the female portion of this latter member remaining intact. Thereafter it is a simple matter to insert other removable members, wedge elements and bolts.

BRIEF DESCRIPTION OF THE DRAWINGS

FIG. 1 is a perspective view of one form of the invention illustrating a removable member secured within a dove-tailed slot of a base member by means of a wedge element and bolt, the particular removable member there depicted being a lug designed to accommodate a knock-in, pry-out mining bit and the like.

FIG. 7 is a semidiagrammatic perspective view showing a plurality of base members such as depicted in FIG. 6 permanently affixed to the drum of a road planing or mining machine and the like.

FIG. 8 is an exploded perspective view, with certain parts ommitted, showing a removable member and base member provided with a keyway and slot for preventing lateral movement between such members.

FIG 9 is a fragmentary side elevation of a portion of the base member of FIG. 8.

FIG. 10 is a side elevation, partly in section, similar to FIG. 2 but showing the use of a wedge element having two tapered surfaces rather than one.

FIG. 11 is a side elevation, partly in section, depicting an arrangement generally similar to that of FIG. 4 but disclosing a key connection between the removable member and the base member at the rear thereof along the path of travel indicated.

FIG. 12 is a side elevation, partly in section, showing the general arrangement of parts depicted in FIG. 4 but with one of the dove-tailed portions of the slot omitted.

FIG. 13 is a side elevation, partly in section, generally similar to that of FIG. 1 but showing the removable member as designed to accommodate a specific, non-rotatable bit.

FIG. 14 is a side elevation of an arrangement generally similar to that of FIG. 4 but disclosing a different kind of removable member and a different relationship between such member and the base member to the rear thereof along the indicated path of travel of these members.

FIG. 15 is a side elevation of an arrangement generally like that of FIG. 1 but depicting the use of a specifically different removable member.

FIG. 16 is a side elevation illustrating an arrangement generally similar to that depicted in FIG. 14 but showing a different relationship between the removable member and the base member at the rear of the dove-tailed slot as considered in the direction of movement indicated.

FIG. 17 is a side elevation illustrating an arrangement like that shown in FIG. 1 but depicting a different style of removable member.

FIG. 18 is a side elevation of an embodiment of this invention wherein a mining machine bit and the like is directly secured within the dove-tailed slot of the base member, such bit responding to the removable member disclosed in the FIGURES previously described.

FIG. 19 is a front elevation of the arrangement shown in FIG. 18, a variation being illustrated in dotted lines.

FIG. 20 is a side elevation illustrating a modification of the invention wherein the removable member is provided with a dove-tailed slot designed to accommodate both a male element provided on the base member and a wedge element.

FIG. 29 is a fragmentary side elevation disclosing a modification of the invention whereby a plurality of removable members may be secured to a machine element by providing the machine element with dove-tailed slots to receive nut-like members and shims to cooperate with wedge elements and bolts.

DESCRIPTION OF THE PREFERRED EMBODIMENTS

Figure 1:
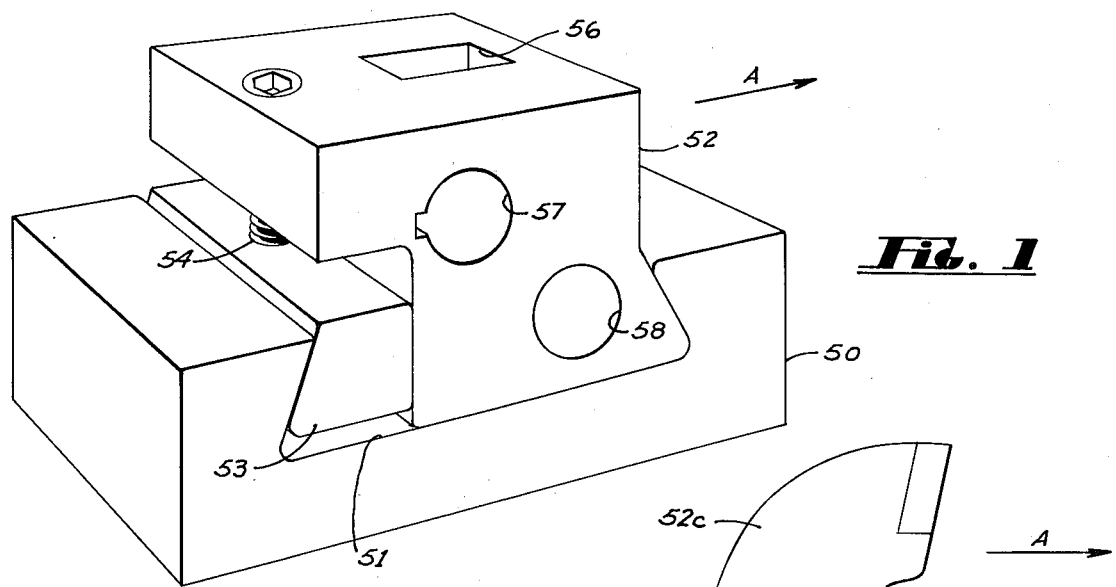
Figure 2:
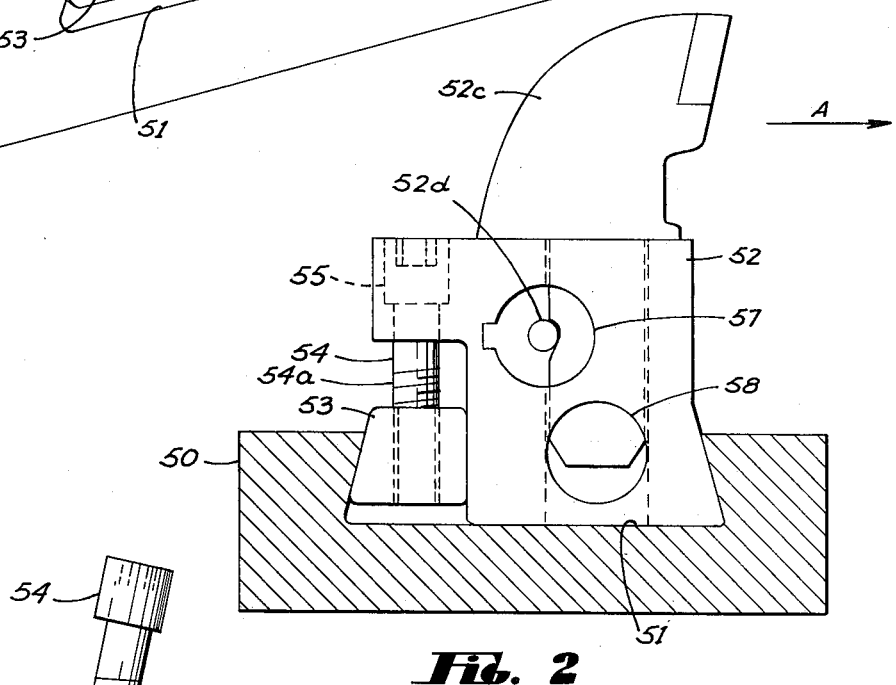
FIG. 2 is a side elevation, partly in section, of the arrangement depicted in FIG. 1.
Figure 3:
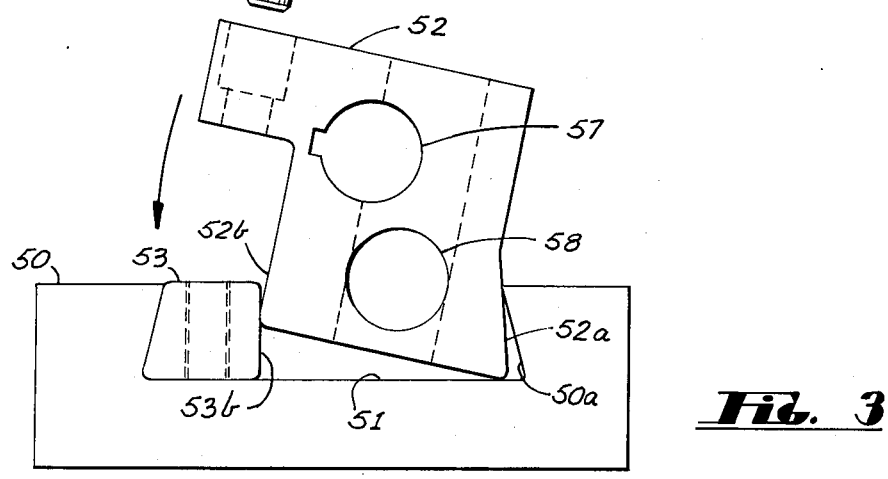
FIG. 3 is an exploded view illustrating how the removable member, wedge element and bolt may be placed within the dove-tailed slot provided in the base member.

Referring first to FIGS. 1, 2 and 3, the invention will be described in connection with a base member which may be considered as an integral part of the driven element of a mining machine, road planing machine, or digging machine and the like, or it may be a separate member which is permanently attached to such a driven element. The removable member which is to be secured to the base member is designed to accommodate a suitable working element such as a mining bit, planing element or digger tooth. For purposes of illustration only, the arrangement here depicted is that of a base member for a mining machine, the removable member comprising a bit carrying lug or block such as that generally shown in U.S. Pat. No. 2,965,365.

It is to be understood that while not only the arrangement of FIGS. 1 through 3 relates to mining machines but also so do most of the remaining illustrations, the invention is not to be limited to mining machines except insofar as specifically set forth in claims. As indicated the invention clearly will have application to road planing machines, earth working machines, and the like.

Specifically, an application of this invention is to replace the "pin-on-block" arrangement shown in U.S. Pat. No. Re. 28,310. In this connection the various base members depicted may be considered as permanently affixed to cutting drums or wheels such as those illustrated at 110, 111 in FIG. 15 of U.S. Pat. No. Re. 28,310 or in FIGS. 22, 23 and 24 thereof. In these arrangements the base member will either be an integral part of the machine, or even the machine itself, or it may in some other manner, such as by welding, be permanently affixed to the driven element, in this case the drum or wheel, of a mining machine. The removable member will constitute a bit carrying lug or block removably affixed to the base member and normally carrying some sort of bit which in turn may be removably secured to the lug.

In these FIGS. 1 through 3 the base member 50 is provided with a dove-tailed slot 51 adapted to accommodate a removable member 52 and a wedge element 53. A bolt 54 has a threaded engagement with the member 53. As shown in FIG. 3 the wedge element 53 may be placed in the dove-tailed slot 51 from above (it is not necessary to insert any of these elements into the slot 51 from the sides thereof) and the removable member 52 may then be placed within this slot, also from above. It will be understood that when the member 52 is completely down in the slot 51, and the portion 52a is in contact with the portion 50a, there will be a slight space between the removable member portion 52b and the wedge element portion 53b. When, however, the bolt 54 is passed through the shouldered orifice 55 into threaded engagement with the wedge element 53 and tightened, the wedge element is thereby moved from the floor of the slot 51 to the position indicated in FIG. 2. In this manner the member 52 is wedged into position within the slot 51 of the base member 50. There is good frictional engagement between the members 50 and 53 and between the members 50 and 52 in the region 50a, 52a. Considering the line of movement imparted to the assembly by the driven element of the mining machine (not shown) of which base member 50 is an integral part or to which base member 50 is affixed (i.e., the cutting direction) as indicated by arrows A in FIGS. 1 and 2, there is thus good frictional engagement among these parts both fore and aft.

As the members are moved in the direction of arrow A the forces resulting from contact of the bit 52c (FIG. 2) carried by lug 52 with the material being acted upon will tend to rock the member 52 in a counter clock-wise direction, thus further insuring good engagement within the slot 51. In this arrangement, therefore, one bolt 54 is sufficient.

Respecting FIGS. 1 through 3, the orifice 56 in lug 52 is intended to receive the shank of a cutter bit 52c of the type shown in U.S. Pat. No. 2,965,365, the orifice 57 will receive an appropriate bit retainer 52d of the type shown in the same Patent, and the orifice 58, communicating with shank receiving perforation 56, may serve as a bleed hold for mine fines, foreign materials and the like.

To remove lug 52 from dove tail slot 51 it is only necessary to remove bolt 54. With bolt 54 removed, it is only necessary to reverse the steps described with respect to FIG. 3. If, under particularly adverse mining conditions, the bolt 54 should become frozen in lug 52 or wedge element 53 through the action of corrosive mine waters, fines and foreign materials, it will be apparent from FIG. 2 that a portion 54a of the bolt is exposed and can be cut, burned or broken with an appropriate drift. In this manner lug 52 and wedge element 53 may be removed and base member 50 and its transverse slot 51 remain undamaged. It will be evident that similar emergency measures may be taken with a majority of the other embodiments of the invention, to be described hereinafter.

Figure 4:
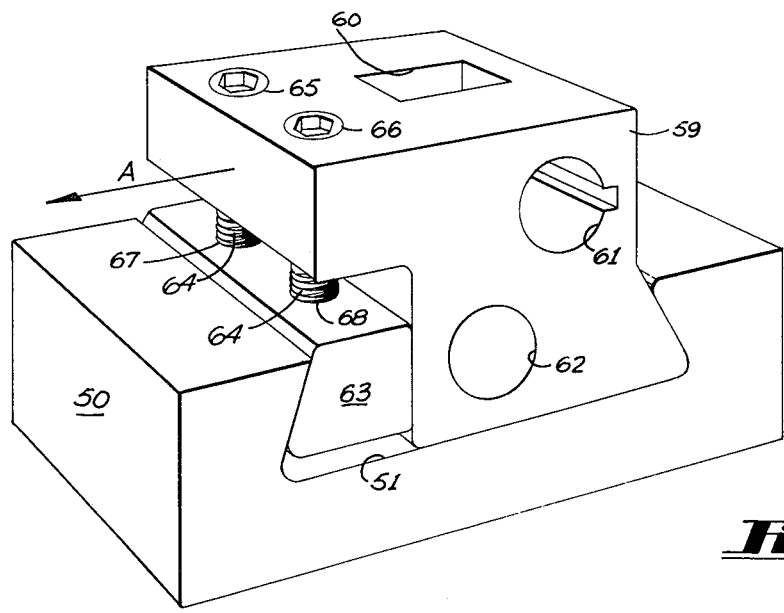
FIG. 4 is a perspective view similar to FIG. 1 but showing the parts as they would preferably be arranged if the direction of machine movement is reversed, the chief difference being the use of two bolts instead of one in this case.

FIG. 4 illustrates a base member having a transverse slot substantially identical to that illustrated in FIGS. through 3 and like parts have been given like index numerals. In FIG. 4, a removable lug 59 is shown. For purposes of an exemplary illustration lug 59 is adapted to receive the same type of cutter bit as lug 52 of FIGS. 1 through 3 and to this end has a shank receiving perforation 60, a transverse retaining means perforation 61 and a bleed hole 62.

Again, the direction of motion imparted to the assembly by the driven element (not shown) of the mining machine or the like (i.e., the cutting direction) is illustrated by arrow A. The embodiment of FIG. 4 differs from that of FIGS. 1 through 3 primarily in that the wedge element 63, equivalent to wedge element 53 of FIGS. 1 through 3, is located at the forward end of lug 59.

Lug element 59 may be mounted in dove tail slot 51 of base member 50 in substantially the same manner described with respect to lug 52. Wedge element 63 is first located in slot 51 and then lug 59 may be rocked into position. In this embodiment a pair of bolts 64, equivalent to bolt 54 of FIGS. 1 through 3, pass through perforations 65 and 66 in lug 59 and into engagement with threaded perforations 67 and 68 in wedge member 63. When bolts 64 are tightened, the wedge element 63, lug 59 and dove tailed slot 51 will cooperate in much the same manner described with respect to the embodiment of FIGS. 1 through 3 to firmly maintain lug 59 in slot 51 and to permit substantially no relative movement therebetween. Since the wedge element 63 is at the forward end of lug 59 in the embodiment of FIG. 4, the resultant cutting forces during the mining action will tend to rock lug 59 rearwardly placing bolts 64 in tension. For this reason, it is perferred to use two bolts in this embodiment.

Figure 5:
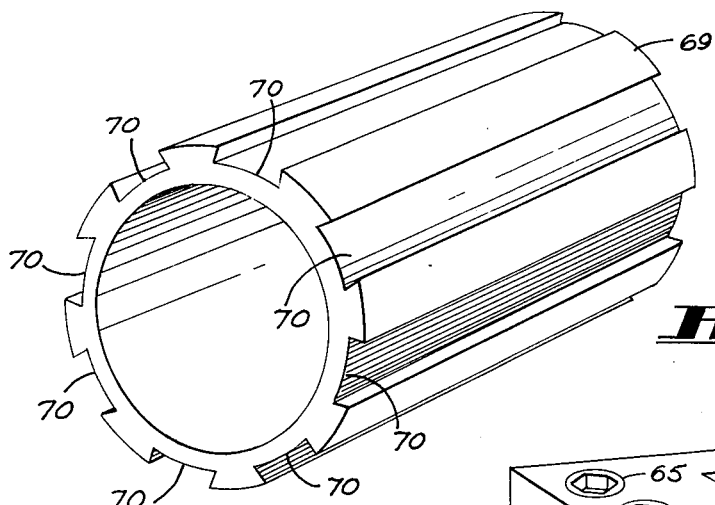
FIG. 5 is a perspective view of the drum of a mining or road planing machine and the like in which the dove-tailed slot to receive the cooperating removable member and wedge element is provided directly therein as distinguished from the slot being provided in a base member or other integral part of the machine.

FIG. 5 is a perspective view of a cutting drum 69 of a mining machine or the like. The cutting drum is provided with a plurality of longitudinally extending dove tail slots 70 about its periphery. Slots 70 are equivalent to the slot 51 of FIGS. 1 through 3 or the slot 51 of FIG. 4. It will be immediately evident that the lug-wedge-bolt assembly of FIGS. 1 through 3, or the lug-wedge-bolt assembly of FIG. 4, could be utilized directly in the slots 70. While these lug-wedge-bolt assemblies could be slid into slots 70 from the side, this is not necessary as described with respect to FIG. 3. Since the assemblies may be placed in slots from above, it will be apparent that the assemblies may be located in any appropriate pattern about the cutting drum. The assemblies may be individually affixed to the drum, or removed from the drum for replacement, both rapidly and efficiently. When the pattern of bit carrying lugs requires it, lug-wedge-bolt assemblies may be located in side-by-side abutting relationship within the same slot 70.

Figure 6:
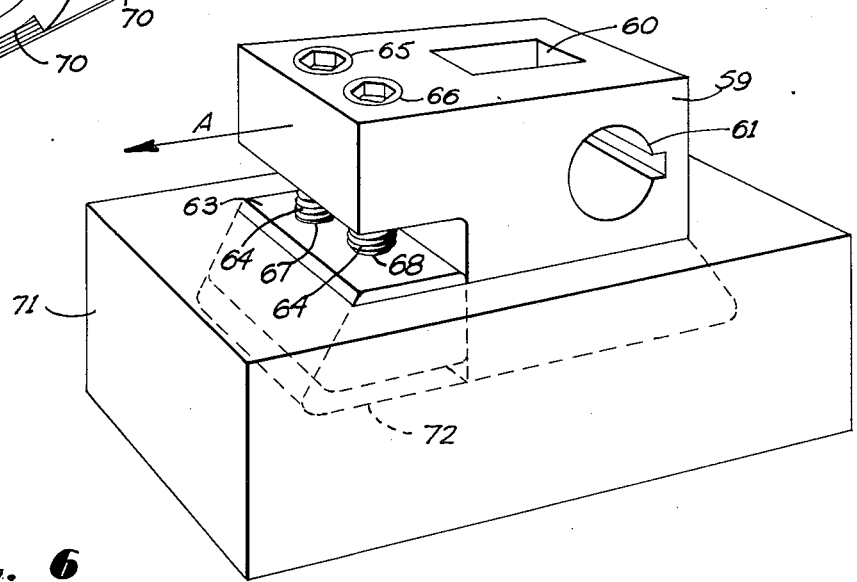
FIG. 6 is a perspective view generally similar to that of FIG. 4 but showing the arrangement as including side walls closing what would otherwise be the open ends of the dove-tailed slot; a cross section, for example, through the center of this FIGURE along that axis thereof which is in the direction of movement indicated, would be the same as a similar cross section through FIG. 4.

In FIG. 6 a lug-wedge-bolt assembly identical to that of FIG. 4 is shown and like parts have been given like index numerals. The difference between the embodiment of FIG. 6 and that of FIG. 4 lies in base member 71. Base member 71 has a central depression 72 equivalent in configuration to slot 51 of base member 50 of FIG. 4. In this instance, however, the slot does not pass through the sides of base member 71. Since the lug 59 and wedge 63 may be located in place from above the depression 72, it is not necessary that the depression 72 extend through the sides of base member 71.

FIG. 5 described above is an example of an instance where the driven element of the mining machine or the like, itself, constitutes the base member for a plurality of bit holding lug-wedge-bolt assemblies. In contrast, FIG. 7 is a semi-diagramatic representation of a cutting drum 73 of a mining machine or the like wherein a plurality of base members 71 (FIG. 6) are affixed to the drum 73 in an appropriate cutting pattern about its periphery. Base members 71 may be attached to cutting drums 73 in any appropriate manner, as by welding or the like. The bottom surfaces of base members 71 may be configured as shown in FIG. 15 of U.S. Pat. No. Re 28,310 so that they may be readily attached to a cutting drum of any appropriate diameter. It will be understood that the lug-wedge-bolt assemblies of FIGS. 1 through 3 or FIGS. 4 and 6 can be located in base mmember 71 as described above.

FIG. 8 is an exploded view of a structure substantially identical to that of FIG. 4 with like parts having been given like index numerals. In FIG. 8 the wedge 63 and bolts 64 have been omitted for purposes of clarity. The embodiment of FIG. 8 differs from that of FIG. 4 only in that a notch 74 is provided in the rearward most end of lug 59 and a corresponding pin 75 is provided in a perforation 76 in base member 50, the perforation 76 intersecting the dove tailed slot 51, as is most clearly seen in the fragmentary side elevational view of FIG. 9.

Pin 75 in base member 50 constitutes a key and notch 74 in the rearward end of lug 59 constitutes a key-way. These elements cooperate to perform two functions. First of all, when the lug 59 is secured in dove tailed slot 51, the pin 75 and notch 74 will prevent forceable lateral shifting of the lug-wedge-bolt assembly in slot 51. More particularly, however, the pin 75 and notch 74 constitute means for precisely locating the lug-wedge-bolt assembly within slot 51. Thus, for example, if such pins were located in an appropriate pattern in the slots 70 of the cutting drum 69 of FIG. 5, lug-wedge-bolt assemblies could be precisely located on the drum in a predetermined pattern much the same way as on cutting drum 73 of FIG. 7 wherein the base members 71 predetermine a pattern for the bit carrying lug-wedge-bolt assemblies.

FIG. 10 illustrates an embodiment similar to that of FIGS. 1 through 3 and like parts have been given like index numerals. The embodiment of FIG. 10 differs from that of FIGS. 1 through 3 in that the surface 52e of lug 52 (equivalent to the surface 52b of FIG. 3) and the cooperating surface 53c of wedge 53 (equivalent to surface 53b of FIG. 3) are themselves tapered, but to a lesser extent than the cooperating tapered surfaces of the wedge 53 and dove tail slot 51. This enables the removal of lug 52 upon removable of bolts 54 even if fines and foreign material do not permit wedge member 53 to shift fully downwardly within dove tailed slot 51.

The structure of FIG. 11 is similar to that of FIG. 4 and again like parts have been given like index numerals. The embodiment of FIG. 11 differs from that of FIG. 4 in that the rearward dove tail of slot 51 has been eliminated and replaced by a rectangular undercut 77. In similar fashion the rearward extending foot of lug 59 has been replaced by a relieved lug or extension 78. The lug extension 78 and rectangular undercut 77 cooperate to key lug 59 to base member 50.

FIG. 12 is again substantially similar to FIG. 4 and like parts have been given like index numerals. In this embodiment, the difference lies in the fact that the rearward dove tail or undercut in slot 51 and the rearward foot of lug 59 have been eliminated completely. While the embodiments of FIGS. 11 and 12 are not preferred, they will perform adequately in those assemblies wherein the wedge element is located at the forward end of the lug.

Thus far all of the embodiments described have been illustrated, for purposes of an exemplary showing, as having removable lugs of the type adapted to receive cutter bits such as are shown in the above mentioned U.S. Pat. No. 2,965,365. The invention, however, is not so limited and in fact the principles of the present invention may be applied to removable lugs of any appropriate type to receive any appropriate type of cutter bit. To this end, FIG. 13 illustrates an assembly substantially the same as that illustrated in FIGS. 1 through 3 and operating in the same manner but utilizing a different style bit. For this reason, like parts have been given like index numerals.

In FIG. 13 the lug 52 is provided with a shank receiving perforation 79 adapted to receive a cutter bit 80 of the type described in U.S. Pat. No. 3,622,206. The cutter bit 80 is provided with a hard cutting tip 81 at one end and a downwardly and rearwardly sloping abutment surface 82 at the other. The lug 52 has a transverse perforation 83 intersecting the shank receiving perforation 79 and through which a pin 84 extends providing a rearwardly and downwardly sloping abutment surface 84a adapted to cooperate with the abuttment surface 82 of cutter bit 80. The abutment surfaces 84a and 82 cooperate to urge the cutter bit to its fully seated position and to keep the cutter bit from rotating within the shank receiving perforation 79 during the cutting action. Again, the cutting direction is indicated by arrow A.

The shank receiving perforation 79 may have an annular notch 85 formed therein to receive a pair of split metal rings 86 and 87 serving as retaining means for the cutter bit 80, as is described in the last mentioned United States Letters Patent.

In all other respects, the lug-wedge-bolt assembly of FIG. 13 cooperates with the base member 50 and slot 51 therein in an identical manner to that described with respect of FIGS. 1 and 3 and may be located and removed from slot 51 as taught above.

FIGS. 14 through 16 illustrate the principles of the present invention as applied to lugs and cutter bits of the type taught in U.S. Pat. No. 3,397,012. Turning first to FIG. 14, a base member 88 equivalent to base member 50 of FIG. 4 is provided with a transverse dove tailed slot 89 equivalent to slot 51 of FIG. 4. A removable lug 90 is illustrated having a forward extension 91 provided with a pair of perforations, one of which is shown at 92 to accommodate a pair of bolts, one of which is shown at 93. The bolts are adapted to threadly engage a wedge member 94. It will be apparent that bolts 93 and wedge member 94 are equivalent to bolts 64 and wedge member 63 of FIG. 4. The lug 90 has a shank receiving perforation 95, a rearwardly extending foot 96 adapted to engage the rearward dove tail undercut of slot 89, and a rearward anvil 97 overlying the upper surface of base member 88 and presenting a rearward abutment surface 98.

The cutter bit 99 has a cylindrical shank portion terminating at its forward end in a hard cutting tip 100 and at its rearward end in an abutment surface 101 adapted to cooperate with abutment surface 98 of the anvil portion 97 of lug 90. Near its rearward end the shank of cutter bit 99 has an annular notch 102 adapted to receive a split metal retaining ring 103. Cutter bit 99 is rotatable in shank receiving perforation 95.

The placement and removal of the lug 90 and wedge member 94 in slot 89 are identical to those described with respect to FIG. 4 and the various elements cooperate in an identical manner.

FIG. 15 illustrates a base member identical to that of FIG. 14 and like parts have been given like index numerals. The lug 104 of FIG. 15 is adapted to receive the same type of cutter bit as is shown at 99 in FIG. 14. To this end the lug 104 is provided with a shank receiving perforation 105 equivalent to shank receiving perforation 95 of FIG. 14 and an anvil portion 106 providing a rearward abutment surface 107 equivalent to abutment surface 98 of FIG. 14.

In this embodiment the anvil 106 is provided with a perforation 108 to receive a bolt 109 adapted to threadly engage a wedge member 110 equivalent to wedge member 53 of FIGS. 1 through 3. It will be evident that the embodiment of FIG. 15 is simply a modification of the embodiment of FIG. 1 through 3 to accommodate a rotating pick-type bit. The lug 104 and wedge 110 cooperate with slot 89 in base 88 in precisely the same manner described with respect to lug 52 and wedge 53 in FIGS. 1 through 3.

FIG. 16 is a modification of the embodiment of FIG. 14 and like parts have been given like index numerals. The embodiment of FIG. 16 differs from tha of FIG. 14 only in that the rearward portion 88a of base member 88 is extended upwardly and the anvil portion 97a of lug 90 no longer overlies the top surface of base member 88.

FIG. 17 is similar to FIG. 15 but illustrates a lug adapted to carry a typical plumb-bob bit of the type taught in U.S. Pat. No. 3,519,309. The base member, wedge and bolts are identical to those illustrated in FIG. 15 and have been given the same index numerals. The lug 111 has a rearward extension 112 provided with a perforation 113 to accommodate bolt 109. A shank receiving perforation is illustrated at 114 to receive the plumb-bob bit 115. Bit 115 comprises a cylindrical shank 116 so sized as to be freely rotatable within shank receiving perforation 114. At its forward end, shank 116 terminates in a conical shoulder 117 adapted to cooperate with the flared forward end 118 of shank receiving perforation 114 to serve as a gauge-determining abutment. The forward end of bit 115 comprises a nose 119 terminating in a hard cutting tip 120. Retaining means (not shown) are normally provided to maintain the shank 116 of cutter bit 115 within shank receiving perforation 114. The assembly comprising the lug 111, bolt 109 and wedge 110 cooperate with base member 88 and its transverse slot 89 in precisely the same manner taught with respect to FIGS. 1 through 3 and 15.

The various embodiments of FIGS. 13 through 17 illustrate that the proportions and configurations of the base members and lugs may vary, but the wedging principle of the present invention is applicable to all of these embodiments.

FIGS. 18 and 19 illustrate an instance wherein a lug for removably mounting a cutter bit has been eliminated. In essence, the lug and cutter bit comprise an integral one-piece structure. For purposes of an exemplary showing, a base is illustrated at 121 having a transverse dove tailed slot 122. Base member 121 may be substantially identical to that described with respect to FIG. 4. It will be understood that it can be a separate member to be welded to the driven element of a mining or digging machine, or it may constitute an integral part of the machine, such as the cutting drum illustrated in FIG. 5.

The cutter bit of FIGS. 18 and 19 is generally indicated at 123 and comprises a wide base portion 124 equivalent to a lug. This wide base portion has a rearwardly extending foot 124a adapted to cooperate with the rearward undercut of dove tail slot 122 and a vertical forward surface 124b adapted to cooperate with a wedge element 125. Wedge element 125 is substantially identical to those wedge elements illustrated previously, as for example in FIGS. 1 through 4.

The upper portion 126 of cutter bit 123 is narrow and carries at its uppermost forward portion a hard cutting tip 127. A forward extension 128 is provided having a perforation 129 therein to receive bolt 130 threadly engaged in perforation 131 of wedge element 125.

Arrow A indicates the cutting direction and it will be evident that this is an instance of the present invention wherein the wedge element 125 is located at the front of cutter bit 123. Therefore, the assembly of cutter bit 123, wedge element 125 and bolt 130 cooperates with base member 121 and its dove tailed slot 122 in the same manner described with respect to the structure of FIG. 4. To this end, wedge element 125 and cutter bit 123 may be located in the slot 122. When wedge element 125 is engaged by bolt 130 and the bolt is tightened, the cutter bit-wedge-bolt assembly will be firmly held in dove tail slot 122 of base member 121 with substantially no relative movement of the assembly within the slot. When cutter bits of the type shown at 123 in FIGS, 18 and 19 are applied to the driven element of a mining machine, it will be understood by one skilled in the art that they will be located on the driven element in an appropriate cutting pattern, as is conventional in the art.

The same sort of structure may serve as a digger or dipper tooth of trenching or digging machines. It will be understood by one skilled in the art that the digger teeth of trenching or digging machines are generally located in side-by-side relationship and there is no bit pattern as in a mining machine application wherein groups of bits follow each other, each group cutting the kerf left by the group of bits ahead of it. It is desirable, therefore, in a digger or dipper tooth application, to have a wide tooth. An exemplary wide configuration is illustrated in broken lines at 132 in FIG. 19. When the upper portion of the digging tool is wide as shown at 132 it will be preferable to widen the forward extension 128 and provide two bolts 130 in threaded engagement with wedge 125.

It will further be evident that either in its cutter bit or digger tooth configuration, the structure of FIGS. 18 and 19 may be modified to provide wedge 125 rearwardly of the cutter bit or dipper tooth, after the manner described with respect to FIGS. 1 through 3.

In all of the embodiments thus far described, the base member (whether a separate member affixed to the driven element of the mining or digging machine or whether constituting an integral part thereof) has been described as being provided with a transverse dove tailed slot. FIG. 20 illustrates a reverse situation wherein the base member may be provided with an upstanding, undercut male member to be received within a transverse slot in the removable and replaceable bit-holding lug. To this end, a base member is illustrated at 133 as constituting either a separate structure to be affixed to the driven element of the mining or digging machine or as an integral part thereof. Base member 133 has an upstanding male element 134 with undercut side surfaces 135 and 136.

A removable and replaceable lug 137 is provided with a transverse slot 138. For purposes of an exemplary showing the cutting direction is again illustrated by arrow A. The forward edge 138a of slot 138 is dove tailed so as to cooperate with surface 135 of male element 134. The rearward edge 138b of slot 138 is vertical in configuration and spaced from surface 136 of male element 134 by a distance sufficient to accommodate wedge element 139.

Wedge element 139 is substantially the same as wedge element 53 of FIG. 1 and is provided with a threaded perforation 140 adapted to receive bolt 141 passing through perforation 142 in lug 137. The lug 137 may have any appropriate configuration to receive any appropriate digger tooth or cutter bit. For purposes of an exemplary showing it is illustrated as having a shank receiving perforation 143, a transverse perforation 144 for a resilient retaining means, and a bleed hole 145; these are equivalent to shank receiving perforation 56, resilient retaining means perforation 57 and bleed hole 58 of FIGS. 1 and 2. Therefore, the lug illustrated as adapted to accommodate a cutter bit of the type shown in FIG. 2.

It will be evident from FIG. 20 that wedge element 139 may first be located in place and the lug 137 may be placed thereover. Bolt 141 is inserted in lug hole 142 and engaged in the threaded perforation 140 of wedge element 139. As the bolt 141 is tightened, wedge 139 will firmly engage surface 136 of male element 134 of base 133 and surface 138b of lug slot 138. Similarly, male element surface 135 will firmly engage lug surface 138a and the lug will be locked in place on base member 133.

The embodiment of FIG. 20 is an instant wherein the wedge element is located rearwardly of the digger tooth or cutting tool, and therefore is analogous to the embodiment of FIGS. 1 through 3. If the cutting direction were reversed in FIG. 20 and appropriate modifications were made in lug 137 to mount and retain the cutting tool or digging tooth, no other cchange need be made in the structure although it might be preferable to provide two bolts 141 rather than one.

FIGS. 21 through 28 illustrate other ways in which the wedging action of the present invention may be accomplished. Again, the cutting direction is indicated by arrow A.

Figure 21:
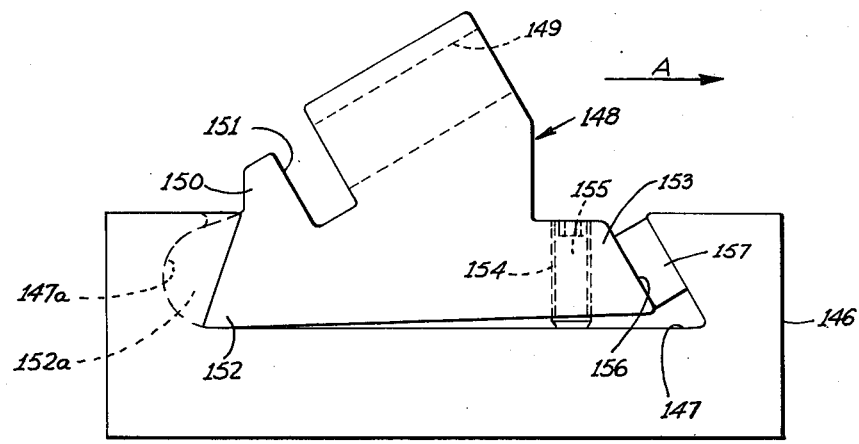
FIG. 21 is a side elevation illustrating an embodiment of the invention in which a different type of wedge is employed and in which the bolt is not in direct contact with the wedge.

Turning first to FIG. 21 a base member 146 is shown having a dove tail transverse slot 147. A replaceable lug is generally indicated at 148. While the lug may be of any appropriate type, for purposes of an exemplary showing it is illustrated as a lug of the general character taught in the above mentioned U.S. Pat. No. 3,397,012 adapted to receive a cutter bit similar to cutter bit 99 of FIG. 14. To this end the lug is shown as having a shank receiving perforation 149, and an anvil portion 150 providing a rearward abutment surface 151. At its rearward end, the lug is provided with a foot 152 adapted to cooperate with the rearward surface of slot 147. At the forward end, lug 148 has an extension 153 provided with a threaded perforation 154 to receive a bolt 155. Extension 153 has a forward surface 156 sloping forwardly and downwardly. Finally, the embodiment of FIG. 21 includes a shim 157.

In the mounting of lug 148 in the slot 147 of base member 146 the lug is first located in place. The distance between the forward surface 156 of the lug and the adjacent dove tailed surface of slot 147 is such that shim 157 may be placed therebetween. As bolt 155 is tightened, its bottom end will abut the bottom of the base member slot 147 causing the forward end of lug 148 to shift upwardly. Surface 156 on the lug will shift into substantial parallelism with the forward surface of base member slot 147, firmly engaging shim 157 therebetween. In this manner, lug 148 will be locked in place with no relative movement between the parts. The resultant cutting forces will tend only to reinforce the engagement of lug 148 in slot 147. The dotted line at the left of FIG. 21 shows how both the foot 152a and slot 147a may be rounded by produce a socket-type engagement between the lug 148 and base member 146.

Figure 22:
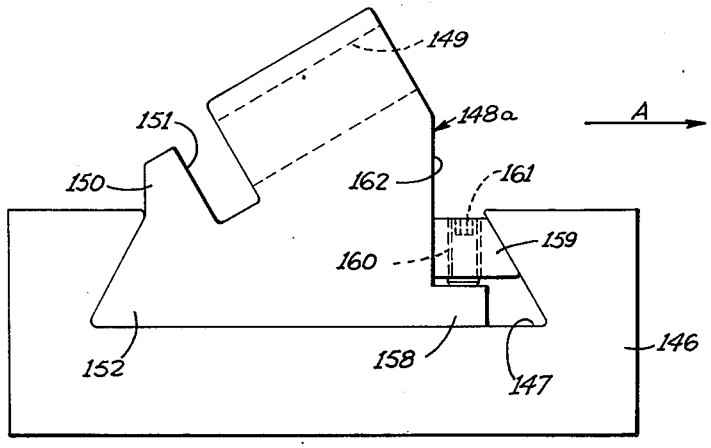
FIG. 22 is a side elevation of a further modification of the invention showing a specifically different utilization of the bolt and wedge element.

FIG. 22 illustrates another wedging arrangement. The base member in FIG. 22 is identical to that of FIG. 21 and like parts have been given like index numerals. Lug 148a of FIG. 22 is similar to lug 148 of FIG. 21 and again like parts have been given like index numerals. In this instance, lug 148a is provided with a forward extension 158. A wedge element 159 is provided above extension 158 and has a threaded perforation 160 adapted to receive bolt 161. Initially, lug 148a may be placed in slot 147 in the position shown. Wedge member 159, in this instance, must be inserted from the side of the base member 146. Bolt 161 is threadedly engaged in perforation 160 in wedge 159 and as bolt 161 is tightened its bottom end will abut lug extension 158 and further tightening will cause wedge 159 to shift upwardly. The wedge will engage the vertical front surface 162 of lug 148a and the adjacent forward surface of slot 147 with a wedging action firmly locking lug 148a in base member 146.

Figure 23:
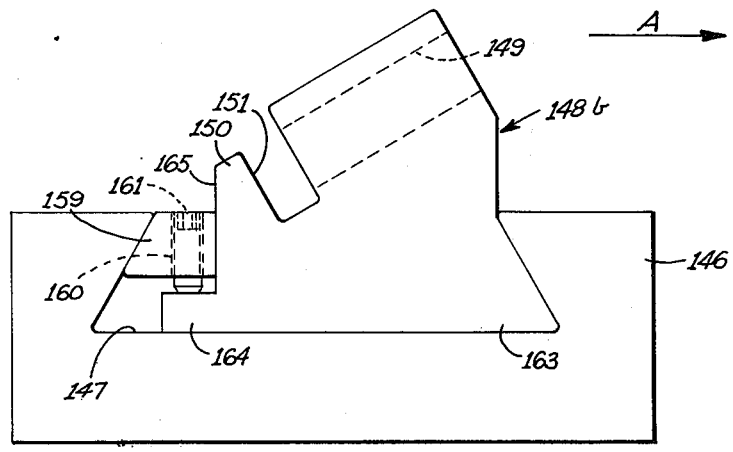
FIG. 23 is a side elevation depicting what in effect is the reverse of the arrangement shown in FIG. 22.

The embodiment of FIG. 23 is similar to that of FIG. 22 with the exception that the wedge element is located rearwardly of the lug. To this end, the base member, bolt and wedge means are identical and have been given like index numerals. Lug 148b is quite similar to lug 148a and like portions have been given like index numerals. In this instance, however, the lug is provided with a forward foot 163 similar to the rearward foot 152 of FIG. 22. A rearward extension 164 similar to forward extension 158 of FIG. 22 is located at the rear of lug 148b. To lock lug 148b in the slot 147 of base 146 the lug is first located in the slot in the position shown and thereafter the wedge is slid in from the side of the base to the position shown. Initial tightening of bolt 161 will cause it to about extension 164. Further tightening of the bolt will result in an upward movement of wedge 159 which will engage between the vertical rear surface 165 of the lug and the adjacent rear surface of slot 147, locking lug 148b in place.

Figure 24:
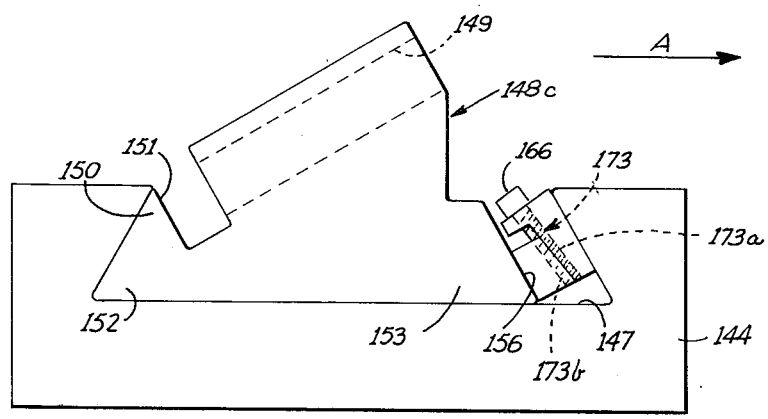
FIG. 24 is a side elevation of a modification of the invention employing an adjustable shim in place of the wedge element.

FIG. 24 illustrates a base substantially identical to the base of FIGS. 21 through 23 and again like parts have been given like index numerals. A lug generally indicated at 148c is shown as being substantially like lug 148 of FIG. 121 and like parts have been given like index numerals. Lug 148c differs from that of FIG. 21 only in that the forward extension 153 does not have a threaded perforation 154.

Figure 25:
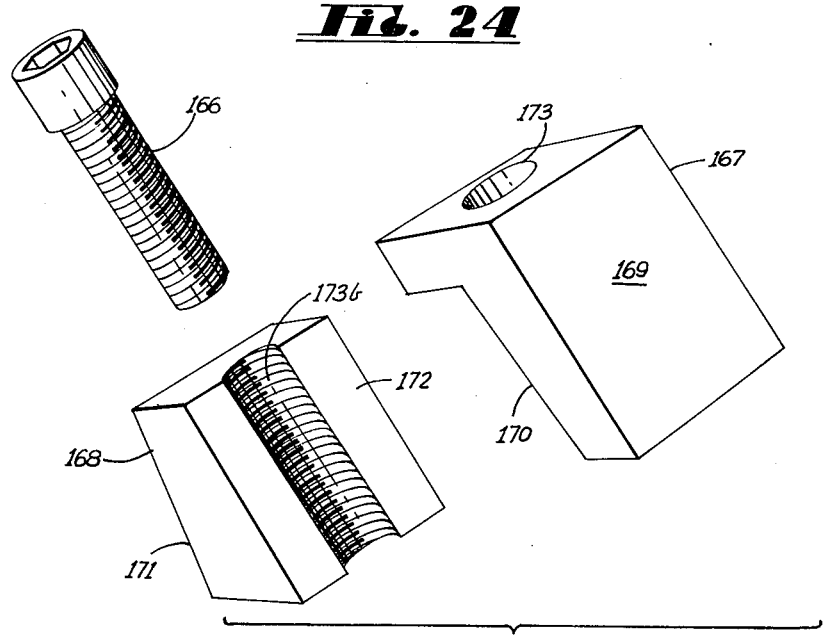
FIG. 25 is an exploded perspective view of the adjustable shim shown in FIG. 24.

In the embodiment of FIG. 24 a wedging action to maintain lug 148c within the slot 147 of base 146 is accomplished through the use of a composite wedge structure. Reference is also made to FIG. 25, constituting an exploded view of the elements making up the composite wedge structure. The composite wedge comprises a bolt 166 and first and second wedge elements 167 and 168, respectively. The first wedge element is of inverted L-shaped configuration and has a forward surface 169 adapted to abut the forward surface of base member slot 147. The rearward surface 170 of wedge member 167 slopes downwardly and toward surface 169. The second wedge element 168 has a rear surface 171 adapted to abut forward surface 156 of lug 148c. The forward surface 172 of wedge element 168 slopes downwardly and away from its rearward surface 171 and is adapted to lie in abutting relationship with the rearward surface 170 of the first wedge element 167. A perforation generally indicated at 173 is provided for bolt 166. As is most clearly seen in FIG. 24, the perforation extends through the upper portion of the first wedge member. Thereafter, one half of the perforation is located in the first wedge member as at 173a and the second half of the perforation is located in the second wedge member as at 173b. The portion 173a of the perforation and that part thereof which extends through the upper portion of the first wedge member is unthreaded. On the other hand, that portion 173b of the bolt perforation located in the second wedge element 168 is threaded, as can be seen from FIG. 25.

In assembly, lug 148c is first located in base member slot 147. Thereafter, bolt 166 is passed through that portion of perforation 173 in the upper part of the first wedge element 167. The second wedge element is thereafter mated with the first wedge element and the composite wedge structure is located in the space between the forward surface 156 of lug 148c and the forward surface of base member slot 147, as shown in FIG. 24. The axis of bolt 166 lies in that plane defined by surface 170 of the first wedge element an abuting surface 172 of the second wedge element. A turning of bolt 166 will, by virtue of its threaded engagement with the second wedge element 168, cause the second wedge element to shift upwardly along the surface 170 of the first wedge element. This, in turn, increases the effective width of the composite wedge assembly firmly locking lug 148c within base member slot 147.

Figure 26:
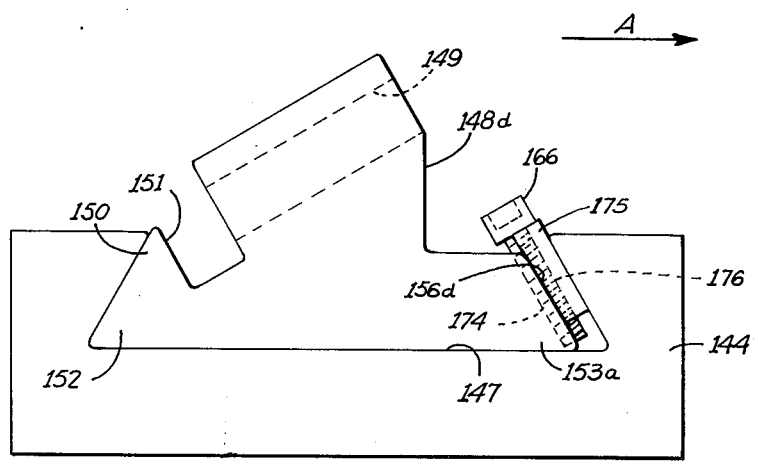
FIG. 26 is a side elevation of an arrangement generally similar to that depicted in FIG. 24 but disclosing a variation wherein a portion of the wedge-shim means is built into the removable member itself.

A modification of the structure of FIG. 24 is illustrated in FIG. 26. The base member is identical to that of FIG. 24 and like parts have been given like numerals. The lug 148d is similar to that of FIG. 24 and again like parts have been given like index numerals.

In essence, in the embodiment of FIG. 26 the secnd wedge element (168 in FIGS. 24 and 25) has been incorporated as an integral part of lug 148d. To this end, the forward extension 153a of lug 148d has been enlarged forwardly and terminates in a surface 156d equivalent to the surface 172 of second edge wedge element 168 (FIG. 25). The surface 156d carries a threaded depression 174 equivalent to the threaded depression 173b of the second wedge element (FIG. 25). A wedge element 175 is provided somewhat similar to the first wedge element 167 of FIG. 25. Wedge element 175 is wedge-shaped rather than L-shaped and has a longitudinal unthreaded depression 176 forming the other half of the perforation to receive bolt 166.

In use, lug 148d is located in the position shown within base member slot 147 and bolt 166 with wedge 175 lying there against is turned into engagement with the threaded depression 156d. As the bolt 166 is further tightened, wedge 175 shifts downwardly with bolts 166, firmly locking lug 148d within base member slot 147.

Figure 27:
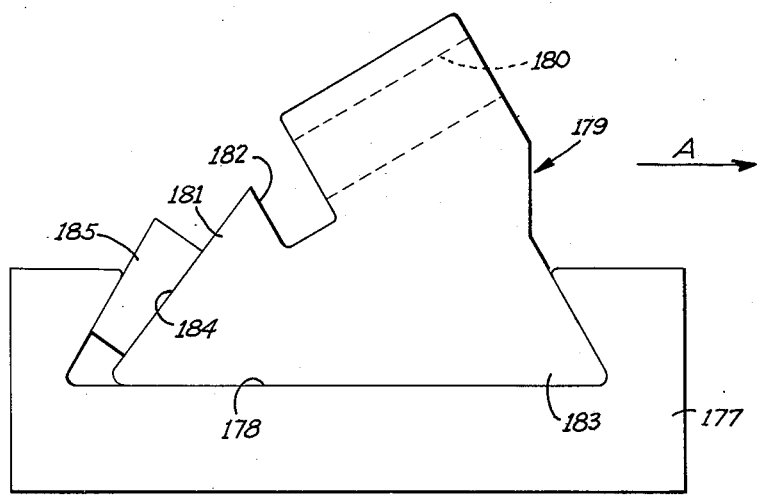
FIG. 27 is a side elevation showing an arrangement wherein the bolts are eliminated and the wedge element is of a knock-in variety.

FIG. 27 illustrates a base member 177 having a dove tailed slot 178 therein as described above. A lug is generally indicated at 179 and is of the type described in the above mentioned U.S. Pat. No. 3,397,012, intended to receive a rotatable pick-type bit such as bit 99 of FIG. 14. To this end, lug 179 is illustrated as having a shank receiving perforation 180, an anvil portion 181 providing an abutment surface 182. The forward end of lug 179 is provided with a foot 183 adapted to cooperate with the forward surface of dove tail slot 178. The rearward end of the lug terminates in a downwardly and rearwardly sloping surface 184 spaced from and non-parallel to the rearward surface of dove tail notch 178. A simple wedge member 185 is provided. To lock lug 179 within base member slot 178 it is not necessary to first locate lug 179 within the base member slot and thereafter to firmly insert wedge 185 between the rearward surface of slot 178 and the rearward surface 184 of the lug by a series of blows from an appropriate tool. Lateral blows with an appropriate tool applied to wedge 185 will release the wedge for removal and replacement of lug 179.

Figure 28:
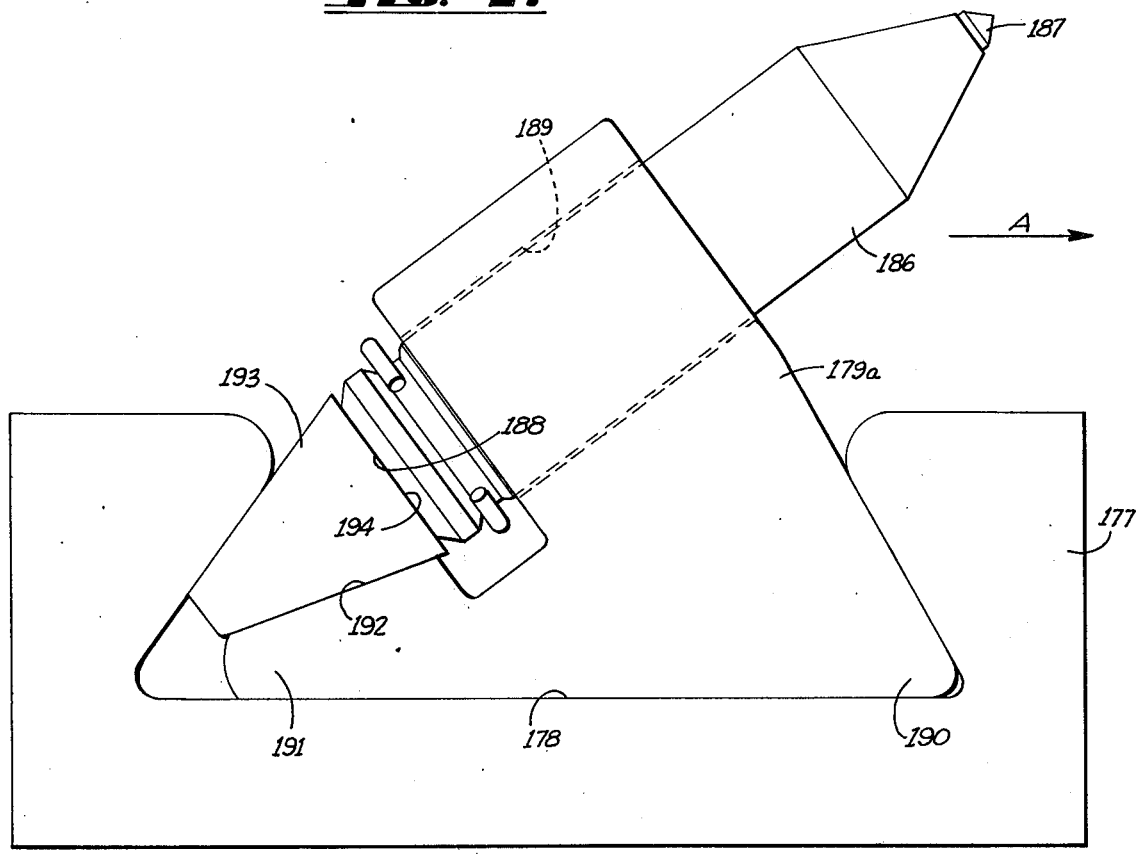
FIG. 28 is a side elevation of a modification of the arrangement depicted in FIG. 27 wherein the wedge element is further held in locking position by means of the bit carried by the removable member.

FIG. 28 illustrates a modification of the embodiment of FIG. 27. The base member is identical to that of FIG. 27 and like parts have been given like index numerals. Lug 179a is similar to that of FIG. 27 and is adapted to carry a pick-type cutter bit 186 of the type shown at 99 in FIG. 14, with a hard cutting tip 187 at its forward end and a guage determining abutment surface 188 at its rearward end. The bit 186 is freely rotatable in the shank receiving perforation 189 of lug 179a.

The lug has a forward foot 190 adapted to cooperate with the forward undercut of dove tailed slot 178. The lug differs from that of FIG. 27 largely in that it bears no anvil portion and no abutment surface to cooperate with abutment surface 188 of cutter bit 186. Instead, the lug 179a has a rearward extension 191 providing a downwardly and rearwardly sloping surface 192 spaced from the rearward surface of base member slot 178. In this embodiment, the lug 179a is first located in the base member slot 178 from the side thereof. Thereafter, a wedge element 193 is located between the lug surface 192 and the rearward surface of dove tail slot 178, also from the side thereof. Wedge 193 may be driven into wedging engagement with the adjacent surface of the base member slot and surface 192 of lug 179a by an appropriate tool extending through shank receiving perforation 189 of the lug. In this manner wedge 193 will firmly maintain lug 179a in place within base member slot 178.

The forwardmost surface 194 of wedge 193 serves in this embodiment as an abutment surface adapted to cooperate with the gauge-determining abutment surface 188 of cutter bit 186. As the assembly is driven in the cutting direction indicated by arrow A, the resultant forces on cutter bit 186 will be substantially axially thereof. The abutment of cutter bit surface 188 and surface 194 of wedge 193 will thereof tend to maintain and reinforce the wedging action of wedge 193. The remove lug 179a, it is only necessary to apply lateral blows with an appropriate tool to wedge member 193 to remove it from the assembly. Upon removal of the wedge, lug 179a may be taken out of base member slot 178.

FIG. 29 illustrates another application of the wedging concept of the present invention. In FIG. 29, for purposes of an exemplary showing, a cutting drum is fragmentarily illustrated at 195. The cutting drum is provided with a plurality of longitudinally dove tailed slots about its periphery, one of which is shown at 196. To this extent, the cutting drum is similar to drum 69 of FIG. 5. In this instance, however, cutting or digging tool carrying lugs are intended to be located on the periphery of the drum between the longitudinal slots therein by wedge elements located within the slots. To this end, a pair of tool carrying lugs are fragmentarily indicated at 197 and 198. The ends of these lugs provide surfaces tapering downwardly and outwardly as is indicated at 197a and 198a, respectively. The bottom surfaces of the lugs, 197b and 198b respectively, are appropriately shaped to rest upon the driven element 195.

A first wedge element 199 is located within slot 196 and is so sized as to be insertable from the top thereof. Wedge element 199 is provided with a threaded perfortion 200. A second wedge element 201 is provided, having an unthreaded perforation 202 adapted to receive a bolt 203. Wedge element 201 is so sized as to engage surfaces 197a and 198a of lugs 197 and 198.

To assemble the embodiment of FIG. 29, wedge element 199 is first located in the slot 196 of driven element 195. A shim member 204 is thereafter located between wedge element 199 and an adjacent side of slot 196. Lugs 197 and 198 are thereafter appropriately located on driven element 95 and wedge element 201 is then located between them. Bolt 203 is caused to pass through perforation 202 of wedge element 201 and into threaded engagement with perforation 200 of wedge element 199. As illustrated in FIG. 29 the assembly is shown in its untightened condition. It will be evident from the FIGURE however, that as bolt 203 is further tightened, wedge element, 199 will be drawn upwardly in slot 196 while wedge element 201 will be drawn downwardly toward wedge element 199. It is to be assumed that similar wedge and bolt assemblies will be located at the other ends of lugs 197 and 198 and in this way the lugs will be firmly affixed to driven element 195. While, for purposes of an exemplary illustration driven element 195 has been described as being a cutting drum, it will be understood by one skilled in the art that the driven element can be of any appropriate type and configuration, the bottom surfaces of lugs 197 and 198 being appropriately shaped to rest thereupon.

Figure 30:
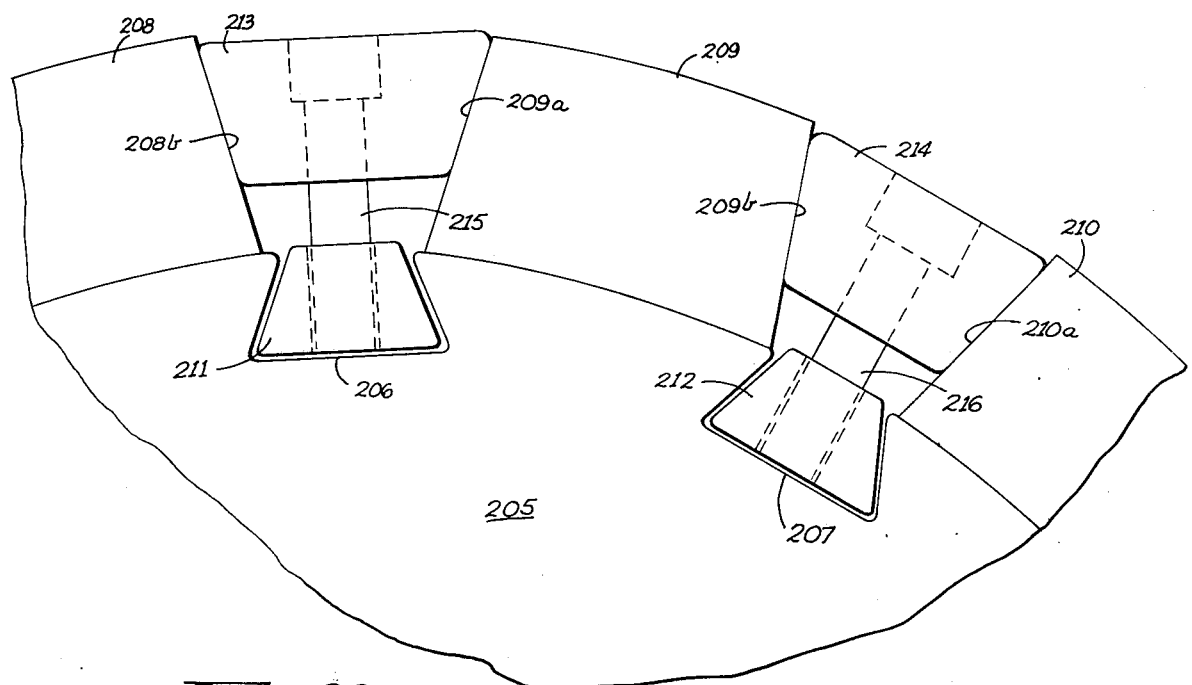
FIG. 30 is a fragmentary side elevation generally similar to that of FIG. 29 but showing an arrangement in which the shims are omitted.

FIG. 30 illustrates a modification of FIG. 29. FIG. 30 illustrates a driven element 205 of a mining machine or the like, again shown in the form of a cutting drum substantially identical to cutting drum 195 of FIG. 29. The cutting drum is again provided with a plurality of longitudinally extending slots 206 and 207. Tool-carrying lugs are located between slots 206 and 207 as at 208, 209 and 210. Lugs 208 through 210 have their bottom surfaces configured to rest upon the periphery of cutting drum 205 and present opposed, downwardly and outwardly sloping end surfaces 208b 209a, 209b and 210a, respectively.

First wedge element 211 and 212 are located in slots 206 and 207, respectively. Second wedge elements are located between lugs 208 through 210 as at 213 and 214. The pairs of cooperating wedge elements 213–211 and 214–212 are provided with bolts 215 and 216, respectively.

The primary difference between the embodiment of FIG. 30 and that of FIG. 29 lies in the fact that wedge elements 211 and 212 are so sized to be just nicely received in their respective slots 206 and 207. While the eliminates the requirement for a shim of the type shown at 204 in FIG. 29, it requires that wedge elements 211 and 212 be inserted in their respective slots from the sides thereof, rather than from the top thereof. In all other respects, the wedge-bolt assemblies of FIG. 30 when tightened, lock lugs 208 through 210 in place in substantially the same manner described with respect to FIG. 29. It will immediately be apparent that in both embodiments of FIGS. 29 and 30 a loosening of the wedge-bolt assemblies will enable ready removal and replacement of the tool carrying lugs. While not shown in the drawings, it will be understood that each of lugs 197 and 198 of FIG. 29 and lugs 208, 209 and 210 of FIG. 30 may be appropriately configured and provided with a shank receiving perforation for any suitable cutter bit such as those heretofore described.

Figure 31:
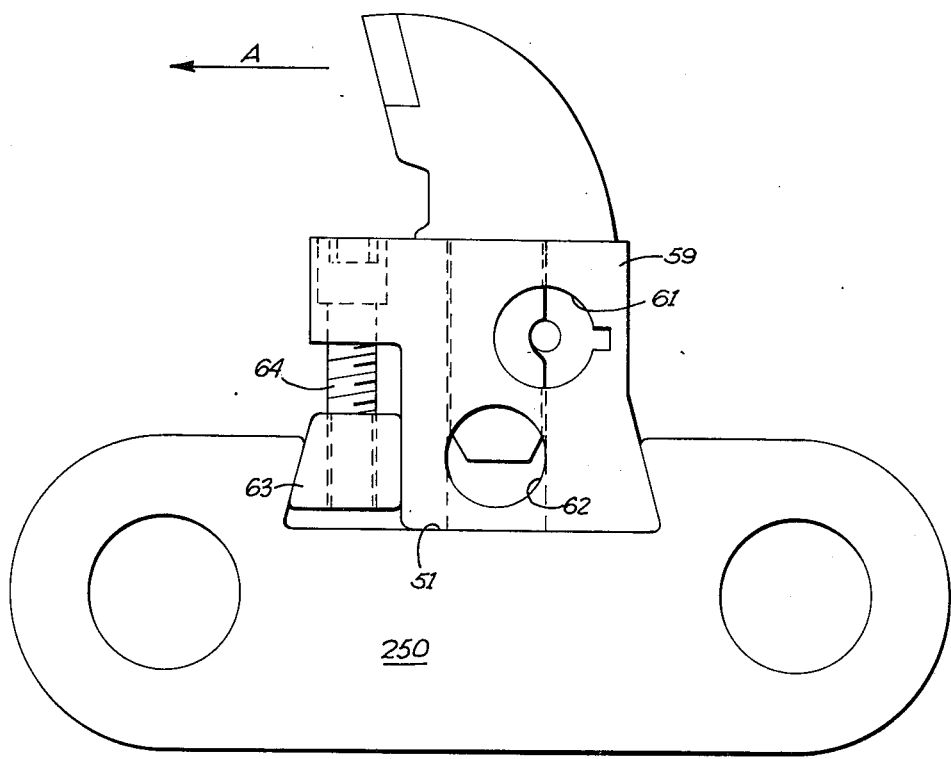
FIG. 31 is a side elevation depicting the invention as applied to a mining chain wherein the base member comprises a chain block.

FIG. 31 is generally similar to FIG. 4 but shows the wedging arrangement as applied to a base member which is in fact the chain block 250 of a mining machine chain. Lug 59 is located in slot 51 provided in the chain block 250 and so also is the wedge element 63. One or more bolts 64 will effect the desired wedging action among the lug 59, element 63 and chain block 250.

Figure 32:
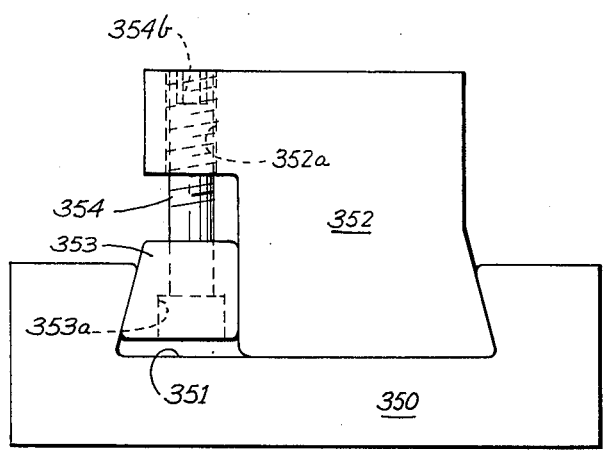
FIG. 32 is a side elevation of a modification of the invention wherein the wedge element is provided with a non-threaded hole to receive a bolt which is threaded into the removable member.

A modified wedging arrangement is illustrated in FIG. 32. The base member 350 is provided with a dovetailed slot 351 to receive a removable member or work tool holder 352 and a wedge element 353. The element 353 is provided with a non-threaded, shouldered bore 353a to receive a headed bolt having a threaded stem 354 which passes freely through the element 353 but into threaded engagement with the work tool holder 352 as indicated at 352a. These parts 352, 353 and 354 may be loosely assembled and placed within the dovetailed slot 351 from an open end thereof whereafter a suitable tool placed in the socket 354b of the bolt 354 will effect the wedging arrangement depicted.

Figure 33:
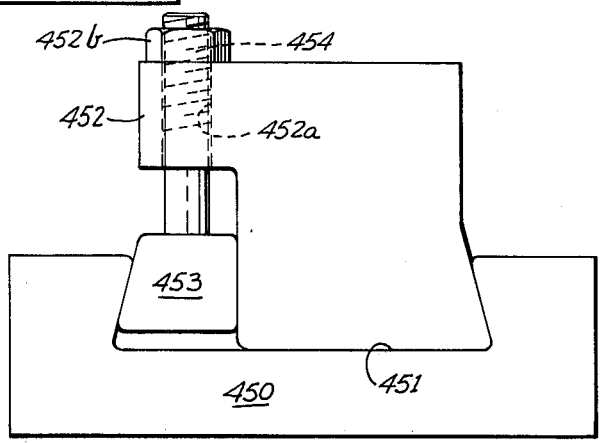
FIG. 33 is a side elevation of a modification of the invention wherein the wedge element is provided with an integral threaded stud which passes through a non-threaded opening in the removable member, the parts being held together by a nut on said threaded stud.

Another modification of the invention is depicted in FIG. 33 wherein the wedge element 453 has an integral threaded stud 454 which passes through a non-threaded bore 452a in the work tool holder 452. The loosely assembled work tool holder 452 and wedge element 453, 454 are placed in the slot 451 of the base member 450 laterally from an open end thereof. A nut 452b is then placed on the end of the threaded stud 454 extending beyond the upper surface of the member 452 and tightened to effect the wedging arrangement depicted.

Figure 34:
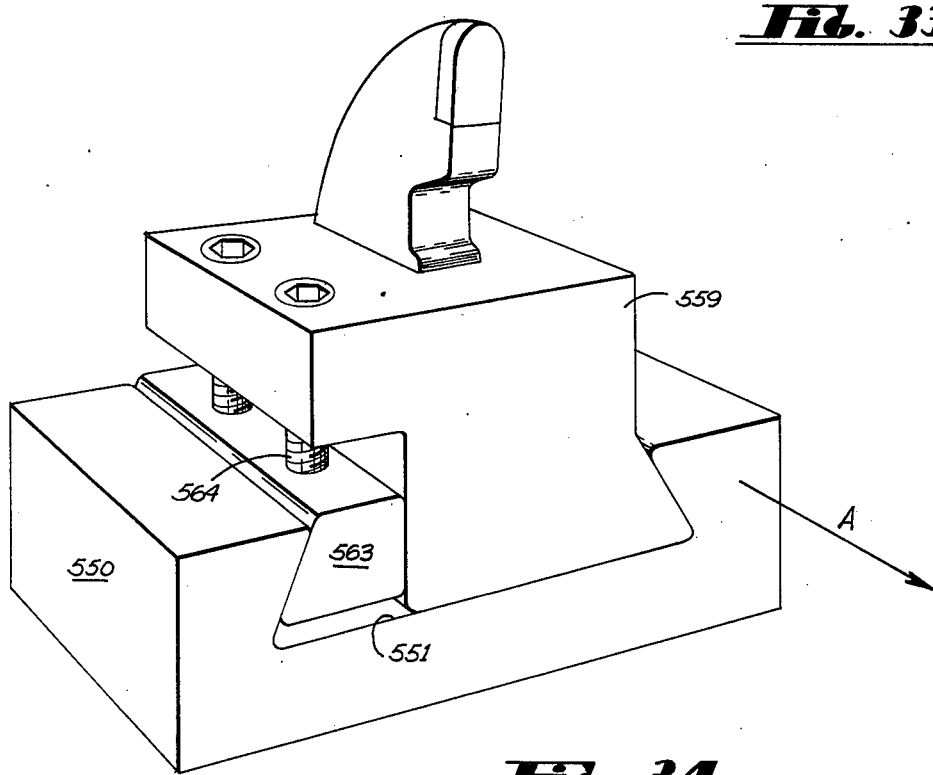
FIG. 34 is a perspective view of a modification of the arrangement of FIG. 4 and shows the cutting tool and cutting direction oriented at 90° to that of FIG. 4.

FIG. 34 depicts an arrangement much like that of FIGS. 1 and 4 but wherein the cutting tool and cutting direction are moved through 90° as indicated by the arrow A. This FIG. 34 emphasizes the fact that the wedging arrangement of this invention is effective to hold the removable member (work tool holder 559) in the slot 551 of the base member 550 by reason only of the element 563 and bolts 564. Thus in this arrangement the bolts 564 effect good frictional engagement of the removable member 559 (the bit carrying block or lug and the like) with the base member both sideways (starboard and port, as distinguished from fore and aft as earlier described) along the line of travel of the driven element of which the base member is a part.

Modifications may be made in the invention without departing from the spirit of it. Various numbers of bolts, for example, may be employed to effect the wedging arrangement and action depicted; the invention is not to be considered as limited to the use of either the one or two bolts illustrated. Furthermore it is possible to place a plurality of work tools in each work tool holder rather than just the one indicated. Similarly some arrangement may utilize a plurality of work tool holders arranged side by side in a common dove tail groove provided in a suitable base member; the cutting drum 69 of FIG. 5 could, for example, be so used.

It is to be further understood that while the invention has been described with respect to certain particular structures and arrangements, the invention is not to be limited to those particular structures and arrangements excepting insofar as they are specifically included in the subjoined claims. Having thus described the invention, what is claimed to be new and what is desired to be protected by way of Letters Patents is:

The embodiments of the invention in which an exclusive property or privilege is claimed are defined as follows:

1. In mining, road working and earth moving machinery a wedging arrangement for removably affixing a work tool holder to a base member, said arrangement comprising: one of said base member and said work tool holder having a slot therein, the other of said base member and said work tool holder being received in said slot; a wedge element in said slot; and holding means to hold said wedge element in said slot in wedging engagement with both of said work tool holder and said base member.

2. The arrangement of claim 1 in which said work tool holder comprises an integral part of a work tool.

3. The arrangement of claim 1 in which slot is in said work tool holder, said base member having a portion received in said slot, said portion having an abutment wall extending over said wedge, element, and said holding means comprising a bolt freely extending through said work tool holder into threaded engagement with draw wedge element, whereby rotative movement of said bolt will drive said wedge element into wedging engagement with said abutment wall and said work tool holder.

4. The arrangement of claim 1 in which said slot is in said base member, said slot defining an overhanging abutment in said base member, said work tool holder having an underlying abutment, said wedge element being located between said overlying abutment and said underlying abutment, and said holding means comprising a bolt threaded into said work tool holder and engageable with said base member, whereby rotative movement of said bolt will move said underlying abutment into wedging engagement with said wedge element so as to lock said work tool holder within said slot.

5. The arrangement of claim 1 in which said slot is in said base member, said slot defining an overhanging abutment in said base member, said work tool holder having an underlying extension, said wedge element being located between said overhanging abutment and said underlying extension, and said holding means comprising a bolt threaded into said wedge element and engageable with said underlying extension, whereby rotative movement of said bolt will move said wedge element into wedging engagement with said overhanging abutment and said work tool holder.

6. The arrangement of claim 1 in which said slot is in said base member, said slot defining an overhanging abutment in said base member, said wedge element comprising a pair of tapered elements between said overhanging abutment and said lug member, and said holding means comprising a bolt threaded into one of said tapered elements, whereby rotative movement of said bolt will cause relative movement between said tapered wedge elements to extend said wedge element to effect wedging of said work tool holder within said base member.

7. The arrangement of claim 1 in which said holding means comprises a frictional wedging engagement of said wedge element with said work tool holder and with said base member.

8. The wedging arrangement of claim 1 in which said slot is in said base member, said slot defining an overhanging abutment in said base member, said wedge element having a wedge portion to engage said overhanging abutment and said work tool holder, said work tool holder having an extension over said wedge element, and said holding means comprising a bolt freely extending through said wedge element into threaded engagement with said extension, whereby rotative movement of said bolt will draw said wedge element into wedging engagement with said overhanging abutment and said work tool holder.

9. The wedging arragement of claim 1 in which said slot is in said base member, said slot defining an overhanging abutment in said base member, said wedge element having a wedge portion to engage said overhanging abutment and said work tool holder, said work tool holder having an extension over said wedge element, and said holding means comprising an integral threaded stud on said wedge element, said stud passing freely through said extension, and nut means to engage the threaded portion of said stud which extends beyond said extension.

10. The arrangement of claim 1 in which said slot is in said base member, said slot defining an overhanging abutment in said base member, said wedge element comprising a movable member having a bolt receiving groove therein, said work tool holder having a threaded bolt receiving groove therein, and said holding means comprising a bolt threaded into said threaded bolt receiving groove and disposed in said first mentioned groove, whereby rotative movement of said bolt will move said movable wedge element into wedging engagement between said overhanging element and said work tool holder.

11. The arrangement of claim 10 including additional means in said work tool holder bearing on said wedge element.

12. The arrangement of claim 11 including at least one additional wedge element between each of said first wedge elements and the respective said overhanging abutment.

13. The arrangement of claim 1 in which said slot is in said base member, said slot defining an overhanging abutment in said base member, said wedge element having a wedge portion to engage said overhanging abutment and said work tool holder, said work tool holder having an extension over said wedge element, and said holding means comprising a bolt freely extending through said extension into threaded engagement with said wedge element, whereby rotative movement of said bolt will draw said wedge element into wedging engagement with said overhanging abutment and said work tool holder.

14. The wedging arrangement of claim of claim 13 in which said base member and said work tool holder are to be moved along a line of travel, said slot being parallel to said line of travel.

15. The wedging arrangement of claim 13 in which said slot is closed at its ends and sides, said slot being open only at the top of said base member.

16. The wedging arrangement of claim 13 in which said wedge element has a vertical wall opposite said wedge portion, said vertical wall engaging said work tool holder.

17. The wedging arrangement of claim 13 in which said wedge element has a slanted wall opposite said wedge portion, and said work tool holder has a correspodingly slanted wall te be engaged by the said slanted wall of said wedge element.

18. The wedging arrangement of claim 13 in which said work tool holder comprises an integral part of a work tool, said base member having a second overhanging abutment defined by said slot, and a protrusion on said work tool received under said second overhanging abutment.

19. The wedging arrangement of claim 13 in which said base member and said work tool holder are to be moved along a line of travel, said slot being at right angles to said line of travel.

20. The wedging arrangement of claim 19 in which said extension and said wedge element are to the rear of said work tool holder as said work tool holder is moved along said line of travel.

21. The wedging arrangement of claim 19 in which said extension and said wedge element are to the front of said work tool holder as said work tool holder is moved along said line of travel.

22. The wedging arrangement of claim 21 in which there are a plurality of said bolts freely extending through said extension into threaded engagement with said wedge element.

23. The wedging arrangement of claim 13 including alignment means to prevent relative movement between said work tool holder and said base member along the axis of said slot.

24. The wedging arrangement of claim 23 in which said alignment means comprises a second overhanging abutment means defined by said slot in said base member, a protrusion on said work tool holder, said protrusion engaging under said second overhanging abutment, a second protrusion on said base member, and notch means on said work tool holder to receive said second protrusion.

25. The wedging arrangement of claim 13 including a second overhanging abutment in said base member defined by said slot, and a protrusion on said work tool holder received under said second overhanging abutment.

26. The wedging arrangement of claim 25 in which said second overhanging abutment is triangular in cross section.

27. The wedging arrangement of claim 25 in which said second overhanging abutment is rectangular in cross section.

28. The wedging arrangement of claim 25 in which said second overhanging abutment extends further above the bottom of said slot than does said first mentioned overhanging abutment.

29. The wedging arrangement of claim 25 in which said work tool holder is adapted to receive a mining bit.

30. The wedging arrangement of claim 29 in which said bit is a knock-in, pry out bit.

31. The wedging arrangement of claim 29 in which said bit is rotatable.

32. The wedging arrangement of claim 29 in which said bit is non-rotatable.

33. The wedging arrangement of claim 29 in which said base member is a chain block for a mining machine chain.

34. The wedging arrangement of claim 31 in which said bit is a plumb bob bit.

35. A work tool holder of the type to be removably affixed to a base member of a mining, road working or earth moving machine by means of a wedging arrangement, said work tool holder comprising: a body having top and bottom walls, front and back walls, and a pair of side walls; and a body extension adjacent said top wall and extending outwardly beyond one of said front and back walls.

36. The work tool holder of claim 35 in which the wall beneath said extension is slanted from the vertical.

37. The work tool holder of claim 35 in which said body comprises an integral part of a work tool.

38. The work tool holder of claim 35 including a body protrusion adjacent said bottom wall and extending outwardly from the other of said front and back walls.

39. The work tool holder of claim 38 in which the wall beneath the said extension is vertical.

40. The work tool holder of claim 38 in which the wall beneath the said extension is slanted from the vertical.

41. The work tool holder of claim 38 in which said body protrusion is provided with notch means to receive an alignment means on said base member.

42. The work tool holder of claim 38 in which said body protrusion is triangular in cross section.

43. The work tool holder of claim 38 in which said body protrusion is rectangular in cross section.

44. The work tool holder of claim 35 in which the wall beneath said extension is vertical.

45. The work tool holder of claim 44 in which the other of said walls is vertical and uninterrupted.

46. The work tool holder of claim 44 in which the other of said front and back walls is notched to receive a portion of said base member.

47. A work tool holder of the type to be removably affixed to a base member of a mining, road working or earth moving machine by means of a wedging arrangement, said work tool holder comprising: a body having top and bottom walls, front and back walls, and a pair of side walls, said bottom wall having a slot adapted to receive a portion of said base member and a wedging element.

48. A work tool holder of the type to be removably affixed to a base member of a mining, road working or earth moving machine by means of a wedging arrangement, said work tool holder comprising: a body having top and bottom walls, front and back walls, and a pair of side walls; and a body portion adjacent said bottom wall and extending outwardly beyond one of said front and back walls.

49. The work tool holder of claim 49 including a body protrusion adjacent said bottom wall and extending outwardly from the other of said front and back walls.

50. The work tool holder of claim 49 including a threaded means in said body extrusion and adapted to project beyond said bottom wall.

51. The work tool holder of claim 49 in which said body extension is rectangular in cross section.

52. The work tool holder of claim 49 in which said body extension is triangular in cross section.

53. The work tool holder of claim 52 in which said body protrusion is triangular in cross section.

54. The work tool holder of claim 53 in which said body extension is provided with at least a portion of a thread to receive some of said wedging arrangement.

55. A base member of the type to removably receive a work tool holder of a mining, road working or earth moving machine by means of a wedging arrangement, said base member comprising: a block having top and bottom walls, front and back walls, and a pair of side walls, said block having a slot therein extending from said top wall towards and spaced from said bottom wall and adapted to receive a portion of a said work tool holder and a portion at least of said wedging arrangement, a portion of said slot being undercut so as to extend beneath said top wall.

56. The base member of claim 55 in which said slot extends from side wall to side wall.

57. The base member of claim 55 in which said slot is located between and spaced from said side walls.

58. The base member of claim 55 including an allignment means located in said slot and adapted to abut said portion of said work tool holder which is received in said slot.

59. The base member of claim 55 in which an undercut portion of said slot is rectangular in cross section.

60. The base member of claim 55 in which the portion of said slot which is opposite said undercut portion is vertical.

61. The base member of claim 55 in which the portion of said slot which is opposite said undercut portion is also undercut so as to extend beneath said top wall.

62. The base member of claim 55 in which the said top wall extending above the undercut slot portion extends above that portion of said top wall which is removed from the undercut slot portion.

63. A base member of the type to removably receive a work tool holder of a mining, road working or earth moving machine by means of a wedging arrangement, said base member comprising: a cylindrical drum, and a plurality of parallel dove tailed groves in the outer surface of said drum, said groves being adapted to receive a portion of said work tool holder and a portion at least of said wedging arrangement.

64. A base member of the type to removably receive a work tool holder of a mining, road working or earth moving machine by means of a wedging arrangement, said base member comprising: a cylindrical drum; and a plurality of blocks affixed to said drum, each said block having top and bottom walls, front and back walls, and a pair of side walls, said block having a slot therein extending from said top wall towards and spaced from said bottom wall and adapted to receive a portion of a said work tool holder and a portion at least of said wedging arrangement, a portion of said slot being undercut so as to extend beneath said top wall.

65. The base member of claim 64 in which said slot is located between and spaced from said front and back walls and between and spaced from said side walls.

66. A base member of the type to removably receive a work tool holder of a mining, road working or earth moving machine by means of a wedging arrangement, said base member comprising: a block having top and bottom walls, front and back walls, and a pair of side walls; and a male element extending from said top wall and adapted to be received within an aperture provided in a said work tool holder, said male element having an undercut portion to receive a portion at least of said wedging arrangement.

67. A wedge member for effecting a connection between a work tool holder and a base member of a mining, road working or earth moving machine, said wedge member comprising: a body adapted to be located between an extension on one of said work tool holder and said base member and the other of said work tool holder and said base member, and means on said body for wedging it between said extension and the other of said work tool holder and said base member.

68. The wedge member of claim 67 in which the said means on said body is on the top thereof, said body having a vertical wall at one side of said means and a slanted wall at the opposite side, said slanted wall sloping away from said vertical wall.

69. The wedge member of claim 68 in which the said means on said body comprises a threaded orifice to receive a bolt extending from said extension.

70. The wedging means of claim 67 in which the said means on said body is on the top thereof, said body having a pair of slanted walls on opposite sides of said means, said slanted walls sloping outwardly away from said top wall and said means.

71. The wedge member of claim 70 in which the said means on said body comprises a threaded orifice to receive a bolt extending from said extension.

* * * * *